(12) United States Patent
Hussain et al.

(10) Patent No.: US 7,834,591 B2
(45) Date of Patent: Nov. 16, 2010

(54) SWITCHING BATTERY CHARGING SYSTEMS AND METHODS

(75) Inventors: M Abid Hussain, Sunnyvale, CA (US); Kenneth C Adkins, Mason, OH (US); Georgios Konstantinos Paparrizos, Foster City, CA (US)

(73) Assignee: Summit Microelectronics, Inc. CA (US)

( * ) Notice: Subject to any disclaimer, the term of this patent is extended or adjusted under 35 U.S.C. 154(b) by 837 days.

(21) Appl. No.: 11/356,594

(22) Filed: Feb. 16, 2006

(65) Prior Publication Data

US 2007/0188134 A1    Aug. 16, 2007

(51) Int. Cl.
*H02J 7/00* (2006.01)
(52) U.S. Cl. .................................. 320/137; 320/128
(58) Field of Classification Search ................. 320/114, 320/124, 28, 132, 137, 143, 151, 152
See application file for complete search history.

(56) References Cited

U.S. PATENT DOCUMENTS

| | | | |
|---|---|---|---|
| 5,534,765 A | 7/1996 | Kreisinger et al. | |
| 5,554,921 A | 9/1996 | Li et al. | |
| 5,831,412 A * | 11/1998 | Morioka et al. | 320/106 |
| 5,986,437 A * | 11/1999 | Lee | 320/162 |
| 6,075,478 A | 6/2000 | Abe | |
| 6,087,810 A | 7/2000 | Yoshida | |
| 6,144,187 A * | 11/2000 | Bryson | 320/137 |
| 6,185,127 B1 | 2/2001 | Myers et al. | |
| 6,297,617 B1 | 10/2001 | Aoyama | |
| 6,351,110 B1 | 2/2002 | Pappalardo et al. | |
| 6,353,305 B1 | 3/2002 | Cannon et al. | |
| 6,366,056 B1 | 4/2002 | Podrazhansky et al. | |
| 6,369,561 B1 * | 4/2002 | Pappalardo et al. | 323/285 |
| 6,400,124 B1 | 6/2002 | Hidata et al. | |
| 6,404,169 B1 | 6/2002 | Wong | |
| 6,420,853 B1 | 7/2002 | Harada et al. | |
| 6,433,517 B2 | 8/2002 | Sakakibara | |
| 6,437,549 B1 | 8/2002 | Takagishi | |
| 6,456,035 B1 | 9/2002 | Crisp et al. | |
| 6,459,237 B1 | 10/2002 | Bausch | |
| 6,476,584 B2 | 11/2002 | Sakakibara | |
| 6,498,461 B1 | 12/2002 | Bucur | |
| 6,507,172 B2 | 1/2003 | Sherman | |
| 6,518,726 B1 | 2/2003 | Nowlin, Jr. et al. | |
| 6,580,249 B2 | 6/2003 | Yau et al. | |
| 6,586,917 B1 | 7/2003 | Smith | |
| 6,605,926 B2 | 8/2003 | Crisp et al. | |
| 6,611,129 B2 | 8/2003 | Bucur | |

(Continued)

OTHER PUBLICATIONS

Microchip Technology Inc., "PS2070 PS200 Switch Mode Charger Evaluation Board", data sheet, 2005.

(Continued)

*Primary Examiner*—Bao Q Vu
*Assistant Examiner*—Nguyen Tran
(74) *Attorney, Agent, or Firm*—Chad R. Walsh; Fountainhead Law Group PC

(57) ABSTRACT

Embodiments of the present invention include techniques for charging a battery using a switching regulator. Some embodiments include programmable switching battery chargers that can be configured using digital techniques. Other embodiments include switching battery chargers that modify the battery current based on sensed circuit conditions such as battery voltage or input current to the switching regulator. In one embodiment, the present invention includes a USB battery charger.

45 Claims, 18 Drawing Sheets

U.S. PATENT DOCUMENTS

| | | |
|---|---|---|
| 6,617,827 B2 | 9/2003 | Knish et al. |
| 6,630,812 B1 | 10/2003 | Davis |
| 6,664,765 B2 | 12/2003 | Dotzler et al. |
| 6,791,297 B2 | 9/2004 | Ott et al. |
| 6,791,300 B2 | 9/2004 | Trinh et al. |
| 6,791,879 B1 | 9/2004 | Adkins |
| 6,794,851 B2 | 9/2004 | Murakami et al. |
| 6,822,423 B2 | 11/2004 | Yau et al. |
| 6,833,685 B2 | 12/2004 | Howard et al. |
| 6,844,705 B2 | 1/2005 | Lai et al. |
| 6,859,016 B2 | 2/2005 | Dotzler |
| 6,917,184 B2 | 7/2005 | Lai et al. |
| 6,919,709 B2 | 7/2005 | Rouverand et al. |
| 7,002,266 B1 | 2/2006 | Adkins et al. |
| 7,633,269 B2 * | 12/2009 | Chou et al. ............ 320/162 |
| 2003/0030412 A1 * | 2/2003 | Matsuda et al. .......... 320/127 |
| 2003/0111980 A1 | 6/2003 | Lee |
| 2004/0164708 A1 * | 8/2004 | Veselic et al. ............ 320/132 |
| 2004/0189251 A1 | 9/2004 | Kutkut et al. |
| 2005/0083016 A1 | 4/2005 | Yau et al. |
| 2005/0134220 A1 * | 6/2005 | Brohlin et al. ............ 320/128 |
| 2005/0189909 A1 | 9/2005 | Guthrie et al. |
| 2005/0253560 A1 * | 11/2005 | Popescu-Stanesti et al. . 320/138 |
| 2005/0275377 A1 * | 12/2005 | Chen ...................... 320/128 |
| 2005/0275381 A1 | 12/2005 | Guang et al. |
| 2006/0119316 A1 * | 6/2006 | Sasaki et al. ............ 320/106 |
| 2006/0139002 A1 * | 6/2006 | Zemke et al. ............ 320/128 |
| 2006/0255767 A1 * | 11/2006 | Wong et al. ............. 320/130 |
| 2007/0090797 A1 * | 4/2007 | Glosser et al. ............ 320/116 |

OTHER PUBLICATIONS

Texas Instruments, "Single-Chip, Li-Ion and Li-Pol Charger IC with Autonomous USB-Port and AC-Adapter Supply Management (bqTINY-II)", data sheet, Aug. 2004.

Linear Technology, "LTC4002 Standalone Li-Ion Switch Mode Battery Charger", data sheet, 2003.

Linear Technology, "LTC 4055 USB Power Controller and Li-Ion Linear Charger", data sheet, 2004.

Linear Technology, "LTC4057-4.2 Linear Li-Ion Battery Charger with Thermal Regulation in ThinSOT", data sheet, 2003.

Texas Instruments, "Synchronous Switchmode, Li-Ion and Li-Pol Charge Management IC with Integrated Powerfets (bqSwitcher)", data sheet, Nov. 2004.

Maxim, "SOT23 Dual-Input USB/AC Adapter 1-Cell Li+ Battery Chargers", data sheet, Jul. 2003.

Intersil, "ISL6293 Li-ion/Li Polymer Battery Charger Accepting Two Power Sources", data sheet, Jan. 4, 2006.

National Semiconductor, "LP3947 USB/AC Adapter, Single Cell Li-Ion Battery Charger IC", data sheet, Nov. 2004.

Office Action from a corresponding foreign application,Korean Appln No. 2007-15500, Issued by the Korean Intellectual Property Office (KIPO) on Nov. 12, 2008.

Office Action from a corresponding U.S. Appl. No. 11/356,561, mailed Apr. 21, 2009.

Office Action from a correspondence foreign application, Chinese Application No. 200710080181.3, issued by the Chinese Intellectual Property Office (CIPO), on Jun. 19, 2009 (Translation provided). (See e.g., comments regarding claims 31, 32, p. 14 and claim 34, p. 15).

* cited by examiner

SWITCHING BATTERY CHARGING SYSTEMS AND METHODS

BACKGROUND

The present invention relates to battery chargers, and in particular, to switching battery charging systems and methods.

Batteries have long been used as a source of power for mobile electronic devices. Batteries provide energy in the form of electric currents and voltages that allow circuits to operate. However, the amount of energy stored in a battery is limited, and batteries lose power when the electronic devices are in use. When a battery's energy supply becomes depleted, the battery's voltage will start to fall from its rated voltage, and the electronic device relying on the battery for power will no longer operate properly. Such thresholds will be different for different types of electronic devices.

Many types of batteries are designed for a single use. Such batteries are discarded after the charge is depleted. However, some batteries are designed to be rechargeable. Rechargeable batteries typically require some form of battery charging system. Typical battery charging systems transfer power from a power source, such as an AC wall plug, into the battery. The recharging process typically includes processing and conditioning voltages and currents from the power source so that the voltages and currents supplied to the battery meet the particular battery's charging specifications. For example, if the voltages or currents supplied to the battery are too large, the battery can be damaged or even explode. On the other hand, if the voltages or currents supplied to the battery are too small, the charging process can be very inefficient or altogether ineffective. Inefficient use of the battery's charging specification can lead to very long charging times, for example. Additionally, if the charging process is not carried out efficiently, the battery's cell capacity (i.e., the amount of energy the battery can hold) may not be optimized. Moreover, inefficient charging can impact the battery's useful lifetime (i.e., number of charge/discharge cycles available from a particular battery). Furthermore, inefficient charging can result from the battery's characteristics changing over time. These problems are compounded by the fact that battery characteristics, including a battery's specified voltages and recharge currents, can be different from battery to battery.

Existing battery chargers are typically static systems. The charger is configured to receive power from a particular source and provide voltages and currents to a particular battery based on the battery's charge specification. However, the inflexibility of existing chargers results in many of the inefficiencies and problems described above. It would be very advantageous to have battery charging systems and methods that were more flexible than existing systems or even adaptable to particular batteries or the changing battery charging environment. Thus, there is a need for improved battery charger systems and methods that improve the efficiency of the battery charging process. The present invention solves these and other problems by providing switching battery charging system and methods.

SUMMARY

Embodiments of the present invention include techniques for charging a battery using a switching regulator. Some embodiments include programmable switching battery chargers that can be configured using digital techniques. Other embodiments include switching battery chargers that modify the battery current based on sensed circuit conditions such as battery voltage or input current to the switching regulator.

In one embodiment, the present invention includes a Universal Serial Bus (USB) battery charger comprising a switching regulator having at least one switching transistor, the switching transistor having first input and a first output, wherein the first input of the switching transistor is coupled to a USB power source, a filter having a first input and a first output, wherein the first input of the filter is coupled to the first output of the switching transistor, and a battery coupled to the first output of the filter, wherein the switching regulator is configured to receive a USB voltage, and in accordance therewith, generate a switching signal to the control terminal of the switching transistor, and wherein a switching current and switching voltage at the output of the switching transistor are coupled through the filter to generate a filtered current and a filtered voltage to charge the battery.

In one embodiment, the filtered voltage is sensed by a voltage controller to control the switching signal at the control terminal of the switching transistor.

In one embodiment, the voltage controller includes a first input coupled to a programmable data storage element, a second input coupled to at least one voltage sense input, and an output coupled to the control input of the switching transistor, wherein the programmable data storage element configures the voltage controller to generate a programmed voltage to said battery if the voltage on said battery is above the first threshold.

In one embodiment, the filtered current is sensed by a current controller to control the switching signal at the control terminal of the switching transistor.

In one embodiment, the current controller includes a first input coupled to a programmable data storage element, a feedback input coupled to at least one current sense input, and an output coupled to the control input of the switching transistor, and wherein the programmable data storage element configures the current controller to supply a first programmed current to said battery if a voltage on said battery is below a first threshold.

In one embodiment, the present invention further comprises receiving an input signal indicating a maximum input current, and programming the current controller to set a maximum battery current based on the maximum input current.

In one embodiment, the current controller has a control input for setting the filtered current, and wherein the control input of the current controller is coupled to the first input of the switching transistor or the battery to reduce the filtered current as the voltage on the battery increases.

In one embodiment, the filtered current is greater than a first input current into the first input of the switching transistor, and the filtered current is reduced as the voltage on the battery increases.

In one embodiment, the USB voltage is in a range of at least 4.1 volts to 5.25 volts.

In another embodiment, the present invention includes a method of charging a battery from a Universal Serial Bus (USB) port comprising receiving a first input voltage and a first input current at the input of a switching regulator from a USB power source, coupling an output of the switching regulator to a terminal of a battery, generating a first output voltage and a first output current at the terminal of the battery, sensing the first output current into the battery or a first output voltage on the battery, and generating a switching signal at a control terminal of the switching regulator in response to the sensed first output current or first output voltage.

In one embodiment, the present invention further comprises receiving a logic signal corresponding to a USB port type, wherein the first output current is greater than 100 mA and the first input current below a 100 mA when the logic signal is in a first state, and the first output current is greater than 500 mA and the first input current is below 500 mA when the logic signal is in a second state.

In one embodiment, the first input voltage is greater than the voltage on the battery, the first output current to the battery is greater than the first input current, and wherein the first output current is reduced as the first output voltage on the battery increases.

In one embodiment, the present invention further comprises storing a charging parameter in a programmable data storage element, wherein the first output current is set by said charging parameter.

In one embodiment, the switching regulator senses the first output voltage and generates a switching signal to control the first output voltage.

In one embodiment, the present invention further comprises storing a charging parameter in a programmable data storage element, wherein the first output voltage is set by said charging parameter.

In another embodiment, the present invention includes a Universal Serial Bus (USB) battery charger comprising a switching regulator having a first input coupled to a USB power source, a first output coupled to a battery through a first resistor, and a control input, a current controller having first and second current sense inputs coupled to first and second terminals of the first resistor for sensing a first output current, and a control output coupled to the control input of the switching regulator, and a voltage controller having a first voltage sense input coupled to the battery for sensing a first output voltage on the battery, and a control output coupled to the control input of the switching regulator.

In one embodiment, the current controller includes a control input for setting the first output current, and wherein a first logic signal corresponding to a maximum USB current is coupled to the control input of the current controller to set the first output current.

In one embodiment, the current controller sets the first output current to be greater than a first input current received at the first input of the switching regulator.

In one embodiment, the control input of the current controller is coupled to the first input of the switching regulator or the battery, and the current controller reduces the first output current in response to a control signal received at the control input as the voltage on the battery increases.

In one embodiment, the present invention include a first programmable data storage element coupled to a control input of a current controller for setting the first output current, wherein the first programmable data storage element configures the current controller to supply a first programmed current to said battery if a voltage on said battery is below a first threshold, and a second programmable data storage element coupled to a control input of a voltage controller for setting the first output voltage, wherein the second programmable data storage element configures the voltage controller to generate a programmed constant voltage to said battery if the voltage on said battery is above the first threshold.

In other embodiments, the present invention may be coupled to other power sources. The following detailed description and accompanying drawings provide a better understanding of the nature and advantages of the present invention.

DETAILED DESCRIPTION

Described herein are techniques for battery charging systems and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1A:
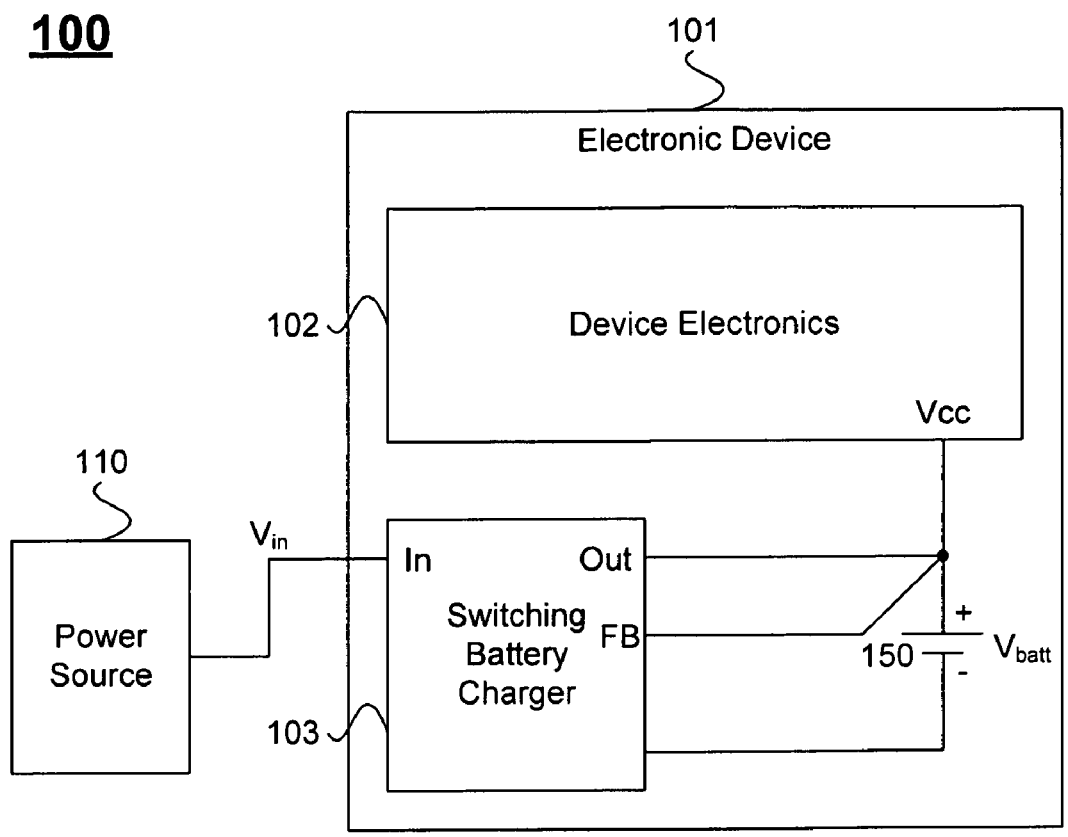
FIG. 1A illustrates an electronic device including a battery charger according to one embodiment of the present invention.

FIG. 1A illustrates a system 100 including electronic device 101 including a switching battery charger 103 according to one embodiment of the present invention. An electronic device 101 includes device electronics 102 powered by a battery 150. The battery may be recharged using switching battery charger 103. Switching battery charger 103 has a first input coupled to a first power source 110 and a first output to provide a regulated output to at least one battery through a filter as described in more detail below. One embodiment of the invention includes coupling an input voltage Vin from a power supply line of a Universal Serial Bus ("USB") port to the input of a switching regulator in charger 103. A switching battery charger allows efficient charging of a battery off of a USB port.

As described in more detail below, the switching battery charger 103 includes a switching regulator. The output voltages and currents from the switching regulator will be switched waveforms, which are provided to a filter for producing filtered output currents and voltages to the battery. For the purposes of this description, the output of the switching regulator will be the output of the filter, which includes an output current to the battery (i.e., a battery charge current) and an output voltage at the battery terminal. As described in more detail below, in one embodiment switching battery charger 103 is coupled to a USB port power source, and the battery of electronic device 101 may be charged from a USB port. Example electronic devices may include cell phones, personal digital assistants, portable music player, or a variety of other battery operated electronic devices. However, a variety of other power sources 110 may be used in other embodiments. Additionally, as described below, different embodiments of battery charger 103 may further include internal circuitry for programming charging parameters, controlling battery charge functions, controlling output currents or voltages, sensing input currents, battery currents, and/or voltages, for example. Charger 103 may use such functionality for controlling the transfer of voltage and current from the power source 110 to the terminal of battery 150.

In one embodiment, switching battery charger 103 is operated in a current control mode to provide a controlled current to battery 150 during a first time period in a charging cycle. During a second time period in the charging cycle, battery charger 103 operates in a voltage control mode to provide a controlled voltage to battery 150. In a current control mode, the output current of the switching charger (i.e., the current into the battery) is used as the control parameter for the circuit (e.g., the current into the battery may be used to control a feedback loop that controls switching). Similarly, in a voltage control mode, the output voltage of the switching charger (i.e., the voltage on the battery) is used as the control parameter for the circuit (e.g., the voltage on the battery may be used to control a feedback loop that controls switching). For example, when the charger is in current control mode (e.g., when the battery voltage is below a certain threshold), the switching regulator may control the output current sourced into the battery. The system may then switch from current control mode to voltage control mode if a voltage on the battery increases above a specified threshold value. If the voltage on the battery rises to a particular level, the system may then control the voltage on the battery (e.g., by maintaining a constant battery voltage) as the uncontrolled current tapers off. As described below, some embodiments of the present invention may program a variety of charge parameters to change the characteristics of a charge cycle. In another embodiment, the current sourced to battery 150 by switching regulator 103 may be modified as the battery charges (e.g., as the battery voltage increases). In one specific example, the sourced current is changed by a digital controller in response to changes in the battery voltage. A digital controller may change stored charging parameters stored in programmable data storage elements (e.g., a register or memory). In another specific example, the sourced current is changed by an analog controller that changes control signals at a control input of a current controller that controls the output current as the battery voltage increases.

Figure 1B:
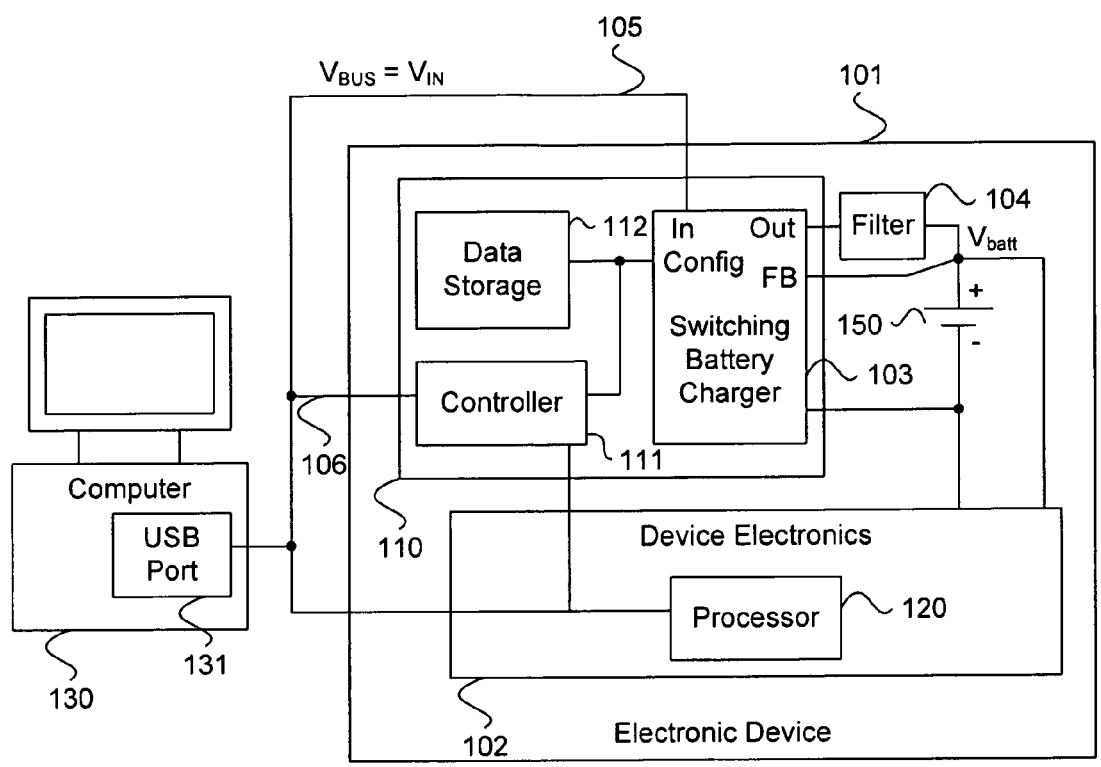
FIG. 1B illustrates an electronic device including a battery charger according to one embodiment of the present invention.

FIG. 1B illustrates an electronic device including a battery charger according to one embodiment of the present invention. An electronic device 101 includes device electronics 102 powered by a battery 150. The battery may be recharged using switching battery charger 103. Switching battery charger 103 may be a programmable switching battery charger. A switching battery charger system 110 may include a switching battery charger 103 which includes a switching regulator having a first input coupled to receive a first power source (e.g., an input voltage Vin) and a first output to provide a regulated output to at least one battery through a filter 104. Switching battery charger 103 may further include internal circuitry for sensing battery current and voltage or input currents and voltages, for example. Switching charger 103 may use such information for controlling the transfer of voltage and current from the power source to the battery terminal.

In this embodiment, battery 150 may be charged from a USB port 131 on computer 130, for example. Of course, it is to be understood that some embodiments of the present invention may be used to charge a battery from any electronic system including a USB port. A USB port may include a power supply terminal 105 (e.g., VBUS) that may be coupled to the input of switching battery charger 103 (Vin). A USB port may further include a data terminal 106 for communicating information over the USB to the battery charger system 110. USB transfers signal and power over a four-wire cable including two data lines (D+, D−), power (VBUS), and ground (GND). The data signals are communicated using two wires (D+, D−). VBUS is typically 5 volts. However, the voltage on the bus may range from 4.75V to 5.25V for a high-powered hub port, or from 4.4V to 5.25V for a low powered hub port. Under transient conditions, the VBUS supply can drop to 4.1 V. Thus, the switching charger may include a switching regulator configured to receive a USB voltage in the range of at least 4.1 volts to 5.25 volts to charge the battery. Additionally, the maximum input current may be either 500 mA for a USB HUB, or 100 mA for a USB HOST. Accordingly, a switching battery charger should be designed to operate with either 100 mA or 500 mA maximum input current. In one embodiment, the battery charger is programmed to accommodate different maximum input currents. Additionally, as described below, the output current supplied to the battery may be larger than the input current to improve charging. In this example, USB data is coupled to a controller 111 included as part of the battery charging system 110. Data may be transferred over USB data line 106 for configuring charging parameters, for example. USB data line 106 may be coupled to device electronics 102, and in particular, to a processor 120 in the device electronics.

In one embodiment, the USB data may include an input signal indicating a maximum input current that can be delivered by the USB device, and the switching battery charger may receive the signal and program a current controller in the charger to set a maximum battery current based on the maximum input current. For example, battery charger 103 may receive a logic signal (e.g., a USB500/100 signal on data line 106) corresponding to a USB port type. The USB port type indicates whether the USB port is a HOST or a HUB. Accordingly, the logic signal corresponds to a maximum USB current. The logic signal may be coupled to a current controller (e.g., by coupling it through a digital controller described below) to set the output current into the battery. Thus, when the logic signal is in a first state, the maximum input current to the switching charger is 100 mA (i.e., USB HOST), and when the logic signal is in a second state, the maximum input current to the switching charger is 500 mA (i.e., USB HUB). In one embodiment described in more detail below, battery charging efficiency may be enhanced by generating a current into the battery that is greater than the input current to the switching system. For example, in one embodiment, when the logic signal is in a first state, the input current to a switching regulator may be below a 100 mA (e.g., USB HOST) and the output current to the battery is greater than 100 mA. When the logic signal is in a second state, the input current may be below 500 mA and the first output current is greater than 500 mA.

Switching battery charger system 110 may further include data storage 112 coupled to switching charger 103 for configuring and controlling the charger. Data storage 112 may store a plurality of charging parameters for controlling charger 103 during the charging of battery 150. The parameters may be reprogrammed to change the voltages and/or currents or other parameters used to charge the battery, and thereby improve battery charging efficiency. The term "programmable" as used herein means changeable (or variable) in response to digital signals (e.g., received over a bus). Thus, some embodiments of the present invention may be programmable without changing physical components, although other embodiments described herein may be programmable by changing physical components such as resistors, for example. Data storage 112 may be either volatile or nonvolatile memory, for example, and the charging parameters may be reprogrammed across different charge cycles or during a single charge cycle (while the battery is charging). As mentioned above, system 110 may also include a controller 111 coupled to data storage 112 and charger 103. Controller 111 may be used to program data storage 112 with charging parameters. Alternatively, controller 111 may store charging parameters for configuring and controlling charger 103 directly. The charging parameters in data storage 112 may be programmed through controller 111 using a digital bus (e.g., serial or parallel), for example. Accordingly, the charging parameters may be changed under control of software, for example, on the electronic device or on an external system such as a computer. In one embodiment, the digital bus is coupled to or implemented using an I²C bus or Universal Serial Bus.

In one embodiment, charging parameters may each be stored as a plurality digital bits, and different charging parameter may be programmed separately and/or independently. The digital bits corresponding to a plurality of charging parameters may then be converted to an analog parameter, such as a voltage or current. The analog parameter may, in turn, be coupled to a node in switching battery charger 103 to modify the behavior of the regulator as desired, and accordingly, change the characteristics of charging. In one embodiment, the digital bits may be converted to an analog parameter using a digital-to-analog converter ("DAC") as described below.

In one embodiment, stored charging parameters may be variable across a range of values. Accordingly, charging characteristics such as constant current and/or constant voltage may be programmed across a corresponding range of current or voltage values, for example. In one embodiment, the range of charge parameter values includes at least a highest value, a lowest value, and a plurality of intermediate values between the highest and lowest values. Thus, the constant voltage or current may be programmed to the highest value, the lowest value, or any intermediate value by reprogramming the corresponding charging parameter in data storage 112. One example advantage of such programming is the ability to use one programmable charger for charging batteries with different voltage ratings and recharge current ratings.

Embodiments of the present invention further include reprogramming one or more charging parameters in accordance with a predefined software algorithm. Software for controlling the charging process may be written in advance and loaded on the electronic device to dynamically control the charging process. For example, electronic device 101 may include a processor 120, which may be a microprocessor or microcontroller, for example. Processor 120 may access charge control software in volatile or nonvolatile memory (e.g., data storage 112 or another memory included as part of electronic device 101) and may execute algorithms for reprogramming the charging parameters in data storage 112. The algorithm may change one or more charging parameters while the battery is charging, for example, or the algorithm may change one or more charging parameters over multiple charging cycles.

Embodiments of the invention may be used in a variety of electronic devices and for charging a variety of battery types and configurations. To illustrate the advantages of certain aspects of the present invention, an example will be described in the context of charging a lithium ion ("Li+") battery. However, it is to be understood that the following example is for illustrative purposes only, and that other types of batteries, such as lithium polymer batteries, nickel metal hydride batteries, or nickel cadmium batteries, for example, having different voltages and charge specifications could also be advantageously charged using the techniques described herein.

Figure 2:
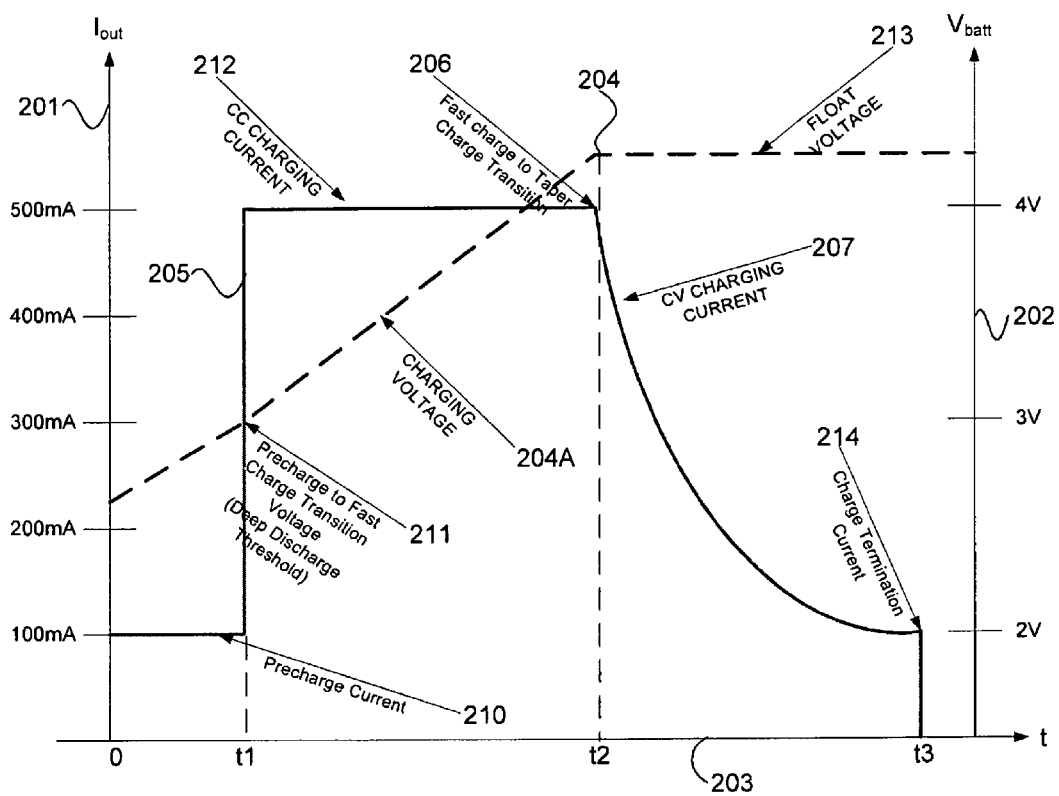
FIG. 2 is an example programmable charge cycle for a battery according to one embodiment of the present invention.

FIG. 2 is an example programmable charge cycle for a battery according to one embodiment of the present invention. The graph in FIG. 2 shows the current into the battery ("Iout") plotted on the left vertical axis 201 and the voltage on the battery ("Vbatt") on the right vertical axis 202 versus time ("t") on the horizontal axis 203. Voltage on the battery over time is shown by the dashed line 204, and current into the battery is shown by the solid line 205. This example illustrates a charge cycle for charging a deeply depleted Li+ battery. Embodiments of the present invention provide programmable control over one or more parameters of the charge cycle curve. The battery is charged in two basic modes: a current control mode, which in this example provides a constant current from t=0, t2, and a voltage control mode, which in this example provides a constant voltage from t=t2, t3, both of which may be programmable across a range of values. In this example, the voltage on the battery is initially below some particular threshold (e.g., 3 volts), indicating that the battery is deeply depleted. Accordingly, the current control mode may initially generate a constant precharge current 210 (e.g., 100 mA), which may be set by a stored charging parameter so that the precharge current can be programmed across a range of values. The constant precharge current 210 will cause the battery voltage to start to increase. When the battery voltage increases above a precharge threshold 211, the system will increase the current control into the battery (e.g., to 500 mA). In one embodiment, the precharge threshold 211 may also be programmed using a stored charging parameter. The system may detect the battery voltage, and if the voltage is below the precharge threshold 211, the system will generate a constant precharge current. When the battery voltage increases above the programmed value for the precharge threshold 211, the system will generate a constant current 212 greater than the precharge current. The second constant current is sometimes referred to as the "fast charge" current.

While the fast charge current is being delivered to the battery, the voltage on the battery will continue to increase as shown at 204A. Embodiments of the present invention also allow programming of the threshold at which the system changes from supplying a controlled current to generating a controlled voltage. For example, a charging parameter corresponding to the threshold at which the system makes the transition from current control to voltage control may be stored in memory. When the voltage on the battery increases above the programmed threshold, the system may automatically transition to provide a constant voltage 213 to the battery. In one embodiment, the voltage 213 supplied to the battery (i.e., the "float" voltage) is set by a stored charging parameter. The float voltage may be set to any number of voltages in a range of voltage values by programming the corresponding stored charging parameter. When the battery increases to the float voltage during current control mode, the system will transition into voltage control mode and maintain the float voltage 213 at the battery. While the system is in voltage control mode, the current 207 into the battery will begin to decrease (i.e., "taper" or "fall off"). In some embodiments, it may be desirable to turn off the charger after the current reaches some minimum threshold (i.e., 100 mA). Thus, a stored charging parameter may be used to detect the current 207 while the system is in voltage control mode. When the current 207 falls below a minimum programmed value, the system may automatically shut down the charger and end the charge cycle. Advantageously, the above parameters may be programmed across a range of values to optimize the particular characteristics of a particular battery during the batteries lifetime, between different charge cycles, or even during a single charge cycle.

Figure 3:
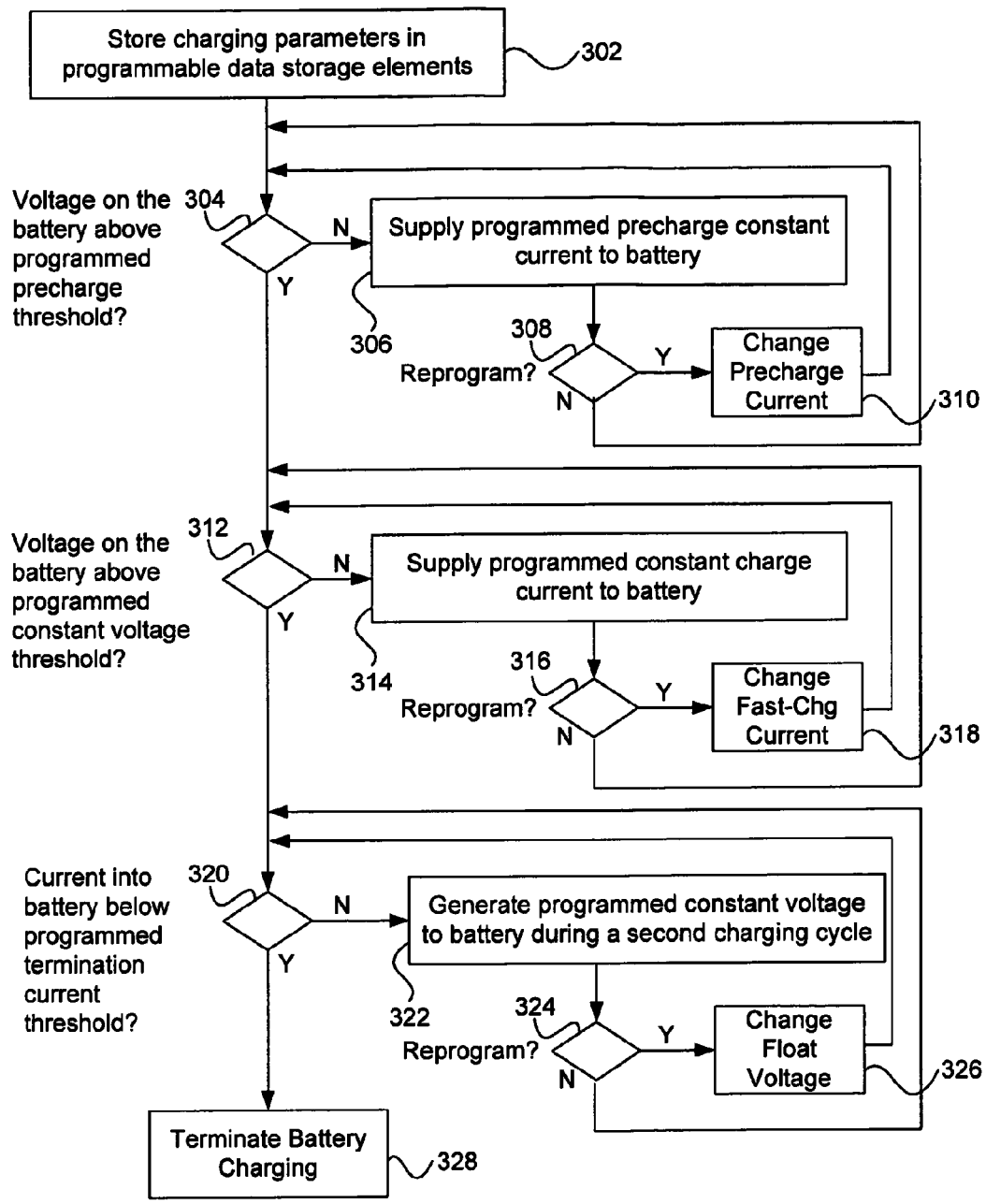
FIG. 3 illustrates the use of programmed battery charging parameters according to one embodiment of the present invention.

FIG. 3 illustrates the use of programmed battery charging parameters according to one embodiment of the present invention. This example illustrates several features of the present invention. At 302, charging parameters corresponding to battery charge characteristics are stored in programmable data storage elements. The charging parameters may be stored as a plurality of digital bits in registers, volatile memory arrays, or nonvolatile memory elements, for example. Storing parameters as multiple bits allows programming of multiple values for each parameter. Accordingly, system parameters, such as currents, voltages, or thresholds, may be programmed across a range of values to accommodate a broad range of battery characteristics. At 304, the voltage on the battery is sensed to determine if the battery voltage is above or below the programmed precharge threshold. If the battery voltage is below the programmed threshold, the programmed constant precharge current is supplied to the battery at 306. In one embodiment, the stored charging parameters may be changed while the battery is charging. For example, if a reprogramming instruction is given at 308, then the charging parameters that control the constant precharge current may be changed at 310, thereby changing the precharge current value delivered to the battery. If the battery voltage increases above the programmed precharge threshold, but still below the float voltage, then the constant current supplied to the battery is increased at 314. The fast charge current may also be changed dynamically during charging by reprogramming the corresponding charging parameter stored in the system as shown at 316 and 318. If the voltage on the battery increases to the programmed current control/voltage control threshold, the system changes from supplying a constant current to providing a constant voltage to the battery at 322. The float voltage may also be reprogrammed across a range of values at 324 and 326. At 320, current into the battery is sensed, and charging is terminated at 328 if the taper current falls below a programmed threshold.

Figure 4:
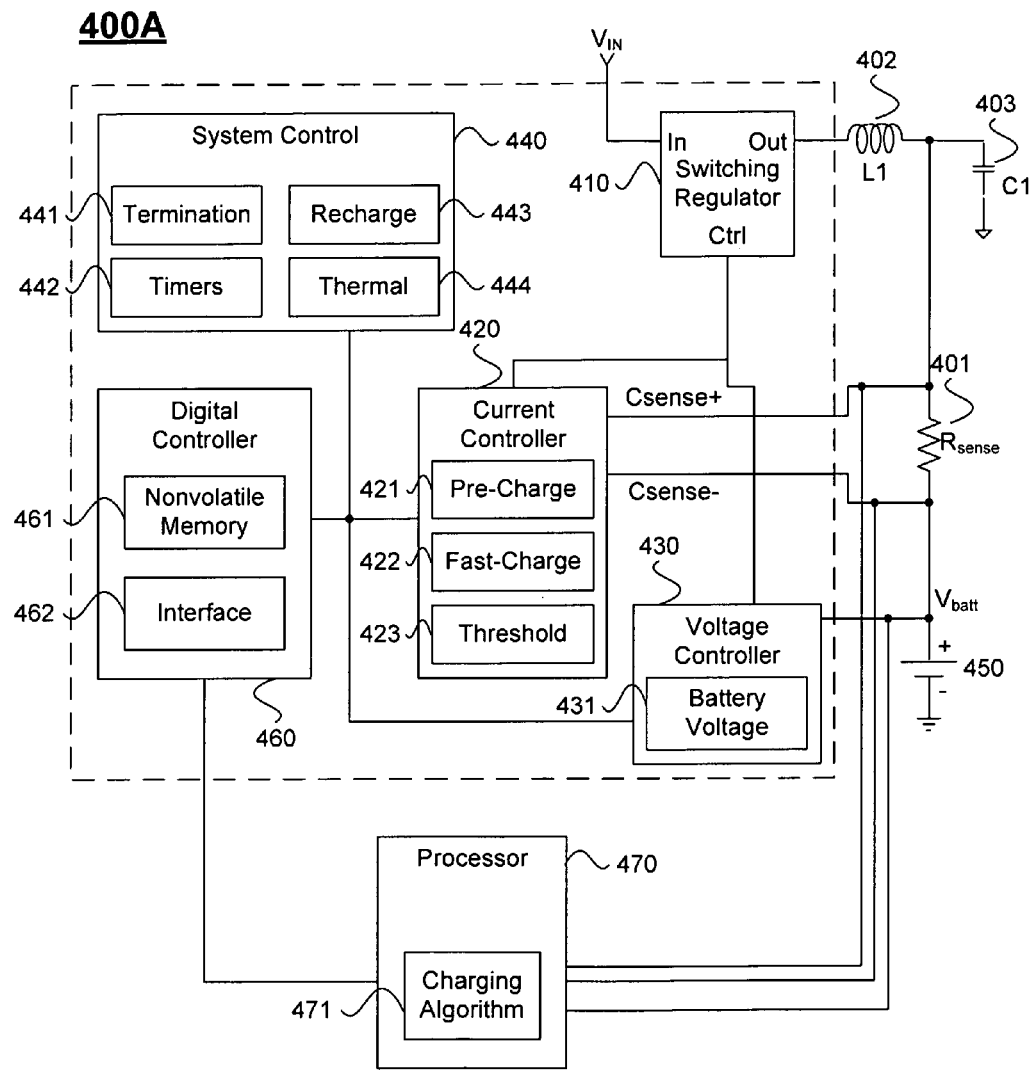
FIG. 4 illustrates a battery charging system according to one embodiment of the present invention.

FIG. 4 illustrates a battery charging system according to one embodiment of the present invention. Battery charger 400 includes a switching regulator 410 having an input terminal coupled to receive a power source (e.g., Vin) and an output terminal coupled through a filter to provide a regulated output to battery 450. In this example, the switching voltage and current at the output of switching regulator 410 are coupled though a filter comprising an inductor 402 and capacitor 403. The filtered output voltage and filtered output current provided into the battery. The switching regulator output current (or battery input current) is sensed by coupling the output of switching regulator 410 to battery 450 through a resistor 401 ("Rsense"). This example further includes a current controller 420 and voltage controller 430 coupled to a control input of switching regulator 410. Current controller 420 is active when the voltage on battery 450 is below a programmed threshold. Current controller 420 includes a stored constant precharge current parameter 421, one or more stored constant fast charge parameters 422, and a stored precharge threshold parameter 423 for setting the precharge current, fast charge current(s), and the precharge threshold, respectively. In this example, current controller 420 controls the current by sensing the voltage through resistor 401 (e.g., Csense+, Csense−). Voltage controller 430 is active when the voltage on battery 450 is above the programmed threshold. The stored battery voltage parameter 431 is used to set the current control to voltage control transition threshold. In this example, voltage controller 430 maintains a constant voltage set by parameter 431 at the battery by sensing the voltage at the battery terminal (Vbatt) and adjusting the control terminal of regulator 410 accordingly.

Embodiments of the present invention further include programming a variety of other parameters relating to the battery charging process. For example, system control 440 includes a termination current parameter for programming the minimum threshold for the battery current. If the battery current falls below the value set by parameter 441, then the charging cycle will terminate. Additionally, the system may store parameters for setting timers 442. For example, a timer may be started when a constant precharge current is initiated. The programmable timer may be used to measuring a time the constant precharge current is supplied to the battery. If the voltage on the battery is below the precharge threshold after the timer reaches a programmed value, the system may automatically terminate the current control and shut down ("time out"), thereby ending the charge cycle. Similarly, a programmed parameter may be used to measure a time the fast charge current is supplied to the battery and set the "time out" for the fast charge current.

In one embodiment, the system may include programmable thermal control. Programmable thermal parameters 444 may include under-temperature and over-temperature parameters that are stored and used to control the operation of the system across temperature. If the temperature of the battery is above the programmed over-temperature limit or below the programmed under-temperature limit, then charging may be suspended. Thermal parameters 444 may also include bias control parameters to program a bias current into a battery temperature sensor. In one embodiment, the battery temperature sensor is an external negative temperature coefficient thermistor. Accordingly, programmable bias control allows for the use of different batteries having different thermistor values, for example. In another embodiment, the system may include a recharge parameter 443. After a charge cycle, the battery may be automatically recharged ("topped off"). For example, when the input power supply is still present, the float voltage may fall below a programmed recharge threshold, a new charge cycle will automatically be initiated.

Battery charger 400 further includes a digital controller 460, which may be implemented using a microcontroller, processor, or state machine, for example. Controller 460 may include (or be coupled to) a nonvolatile memory 461 for storing one or more of the charging parameters. Controller 460 may also include an interface 462 for communicating with external resources or a processor 470 located on the same electronic device. In one embodiment, charging parameters may be stored in nonvolatile memory 461 and transferred to volatile storage devices. Controller 460 may interface with processor 470 to reprogram the stored parameters either in nonvolatile memory or in volatile memory. For example, processor 470 may include a software charging algorithm 471 for changing the parameters. The processor may be coupled to analog-to-digital circuits (not shown) that sense battery voltage and current, and the algorithm may change the stored parameters based on the sensed currents and voltages in the battery, for example.

Figure 5:
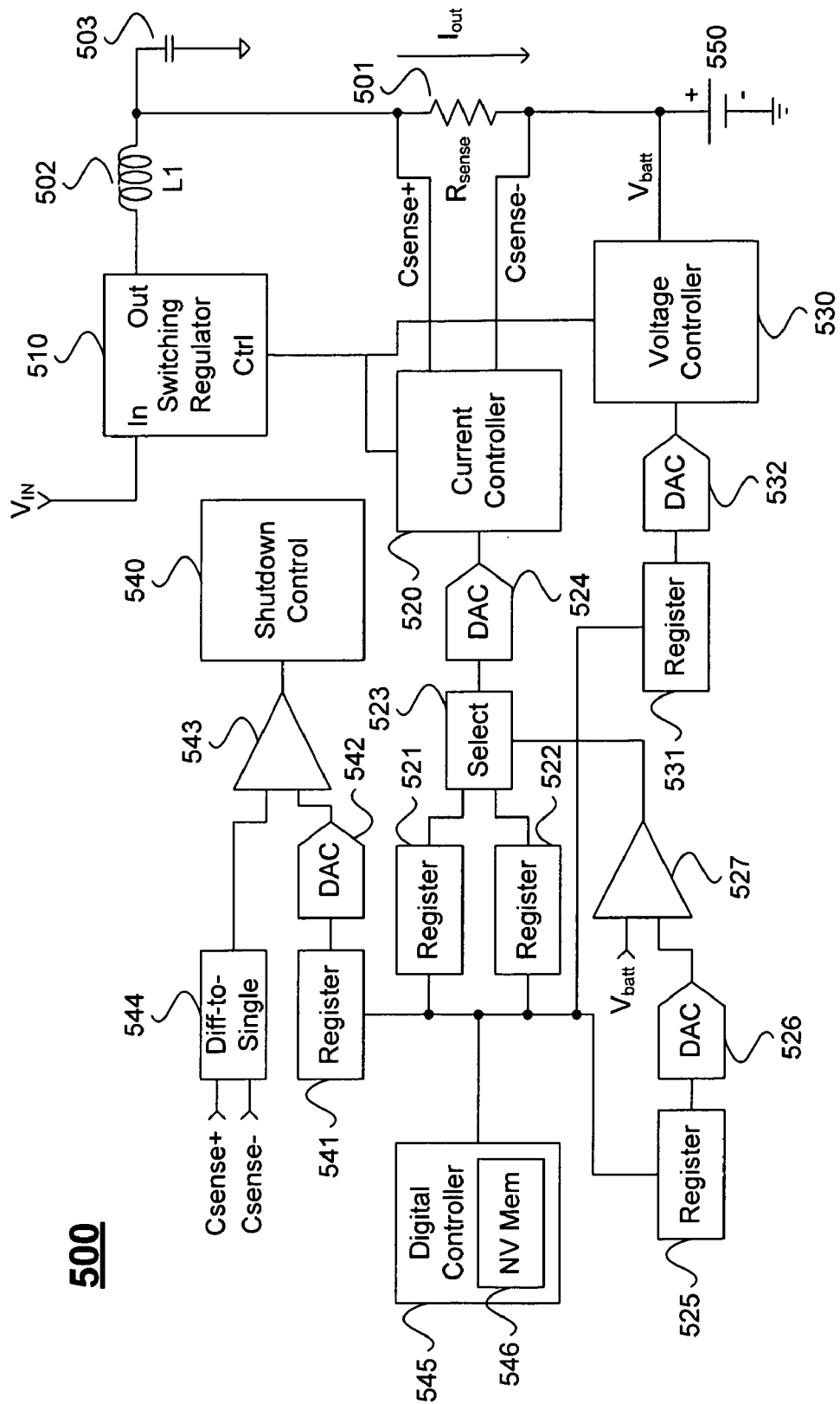
FIG. 5 illustrates a battery charging system according to one embodiment of the present invention.

FIG. 5 illustrates a battery charging system according to one embodiment of the present invention. Battery charger 500 includes a switching regulator 510 having an input for receiving a power source and an output coupled to battery 550 through a filter, comprising an inductor 502 and capacitor 503, and a current sense resistor 501. A current controller 520 senses the current in resistor 501 and provides a signal to a control input of regulator 510 for maintaining a controlled (e.g., constant) current. The controlled current may be programmed by parameters stored as digital values in registers 521, 522, and 525. For example, register 521 may store a digital precharge parameter value, and register 522 may store a digital fast charge parameter value. The two different values may be selectively coupled to the current controller 520 to set the current supplied to the battery. Register 525 may hold a digital value for setting the precharge threshold. The bits of register 525 may be inputs to a digital-to-analog converter ("DAC") 526, which may translate the bits into an analog parameter such as a voltage, for example. A voltage output of DAC 526 may be used as a reference and compared to the battery voltage in comparator 527. When the battery voltage is below the programmed precharge threshold, the comparator may couple the stored precharge current value in register 521 to DAC 524 using select circuit 523 (e.g., a multiplexer). DAC 524, in turn, receives the digital value corresponding to the precharge current and generates an analog parameter for controlling the switching regulator to deliver the programmed current value. When the battery voltage increases above the value programmed in register 525, the comparator changes state, and select circuit 523 couples the stored fast charge current value in register 521 to DAC 524. DAC 524, in turn, receives the new digital value corresponding to the fast charge current and generates an analog parameter for controlling the regulator to deliver the new programmed current value. It is to be understood that the above circuit is just one example implementation. In another example, the precharge threshold may be controlled by using the battery voltage to drive a voltage divider. Particular taps of the voltage divider may be digitally selected by a programmable register. A selected tap may then be coupled to a comparator and compared to a reference voltage, for example.

Similarly, voltage controller 530 is coupled to register 531 for storing the threshold for changing from current control mode to voltage control mode. Register 531 stores the threshold as a digital value. The digital bits of register 531 are input to DAC 532 and converted into an analog parameter for maintaining a constant programmed voltage on the battery.

In this example, register 541 is used to program the termination current value. Battery current Iout may be sensed by resistor 501 and the differential voltage may be converted to a single ended value in differential-to-single ended converter 544. The digital value in register 544 corresponding to the desired termination current may be converted into a voltage by DAC 542. The voltages from both the differential-to-single ended converter 544 and DAC 542 may be input to comparator 543. When the battery current decreases (tapers off) below the programmed value, the comparator may generate a signal to shutdown control 540 and terminate the charge cycle.

Battery charger 500 includes a controller 545 for manipulating digital information in the system. Controller may include circuits for reading and writing to memory or registers, for example, as well as other system control functions such as interfacing with other electronics over a serial or parallel bus. As mentioned above, the charging parameters may be stored in a nonvolatile memory 546 such as an EEPROM, for example. In this example, the parameters are stored in nonvolatile memory 546 and transferred to registers 521, 522, 525, 531, and 541. If a software algorithm is used to modify the parameters, the algorithm may change the parameter values in either the registers (e.g., for dynamic programming) or in the nonvolatile memory (e.g., for static programming).

Figure 6:
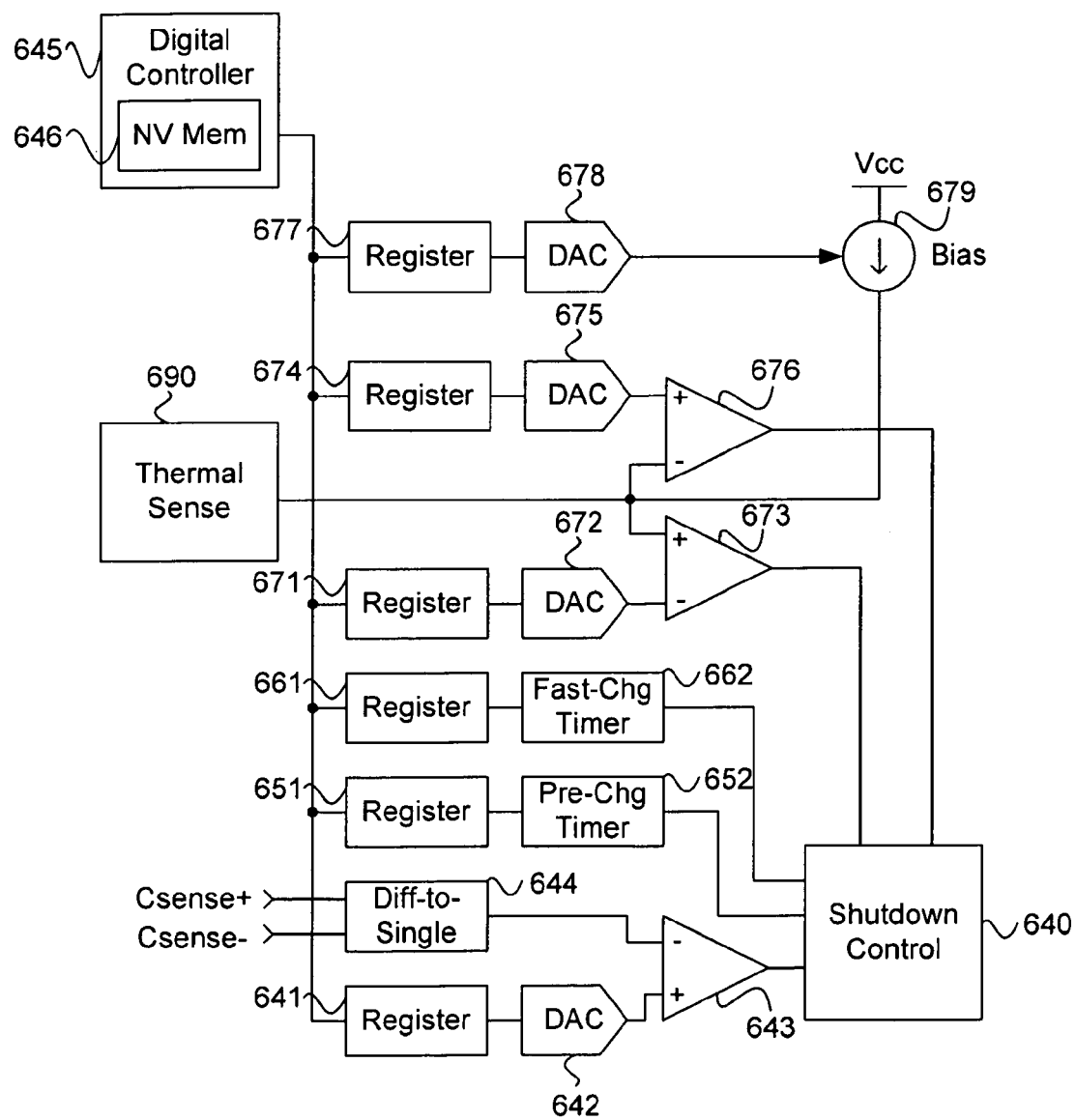
FIG. 6 illustrates battery charging parameters according to one embodiment of the present invention.

FIG. 6 illustrates battery charging parameters according to one embodiment of the present invention. In this example, a variety of stored parameters are programmed by controller 645 to condition the charge cycle by loading registers with charging parameters stored in nonvolatile memory 646. For example, register 641 is used to program the termination current in conjunction with DAC 642, differential-to-single ended converter 644 and comparator 643 as described above in reference to FIG. 5. Additionally, register 651 may be used to program a precharge timer 652, and register 661 may be used to program a fast charge timer 662. Timer 652 may shut down the charge cycle if the voltage on the battery does not increase above a programmed precharge threshold value within the programmed time period. Likewise, timer 662 may shut down the charge cycle if the voltage on the battery does not increase above a programmed constant current to constant voltage transition threshold within the programmed time period.

Registers 671 and 674 may be programmed with over-temperature and under-temperature parameters. The digital values of registers 671 and 674 are coupled to the inputs of comparators 673 and 676, respectively, and define the upper and lower bounds of a voltage range. The other inputs to comparators 673 and 674 are coupled to a thermal sensor 690 that detects the batteries temperature. If the battery temperature results in a voltage that is above the programmed over-temperature limit or is below under-temperature limit, the comparators will shut down the charge cycle to protect the battery. In one embodiment, a bias current 679 is programmed by register 677 and DAC 678 to adjust the voltage on the thermal sensor. In one specific example, the thermal sensor includes a negative temperature coefficient thermistor, and the bias current may be programmed to optimize the temperature range of the thermal sense circuits.

Figure 7A:
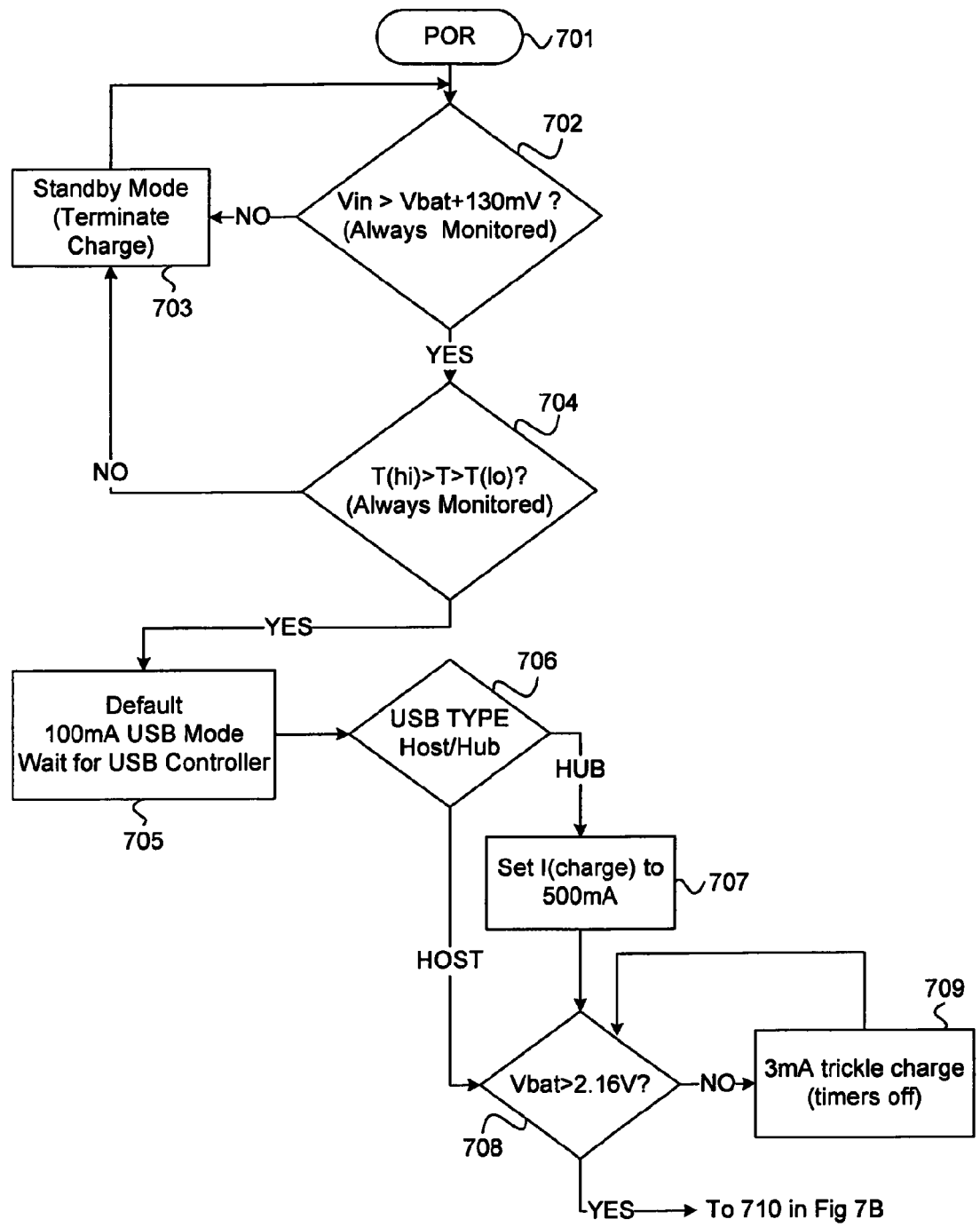
FIGS. 7A-B is an example charge cycle according to one embodiment of the present invention.
Figure 7B:
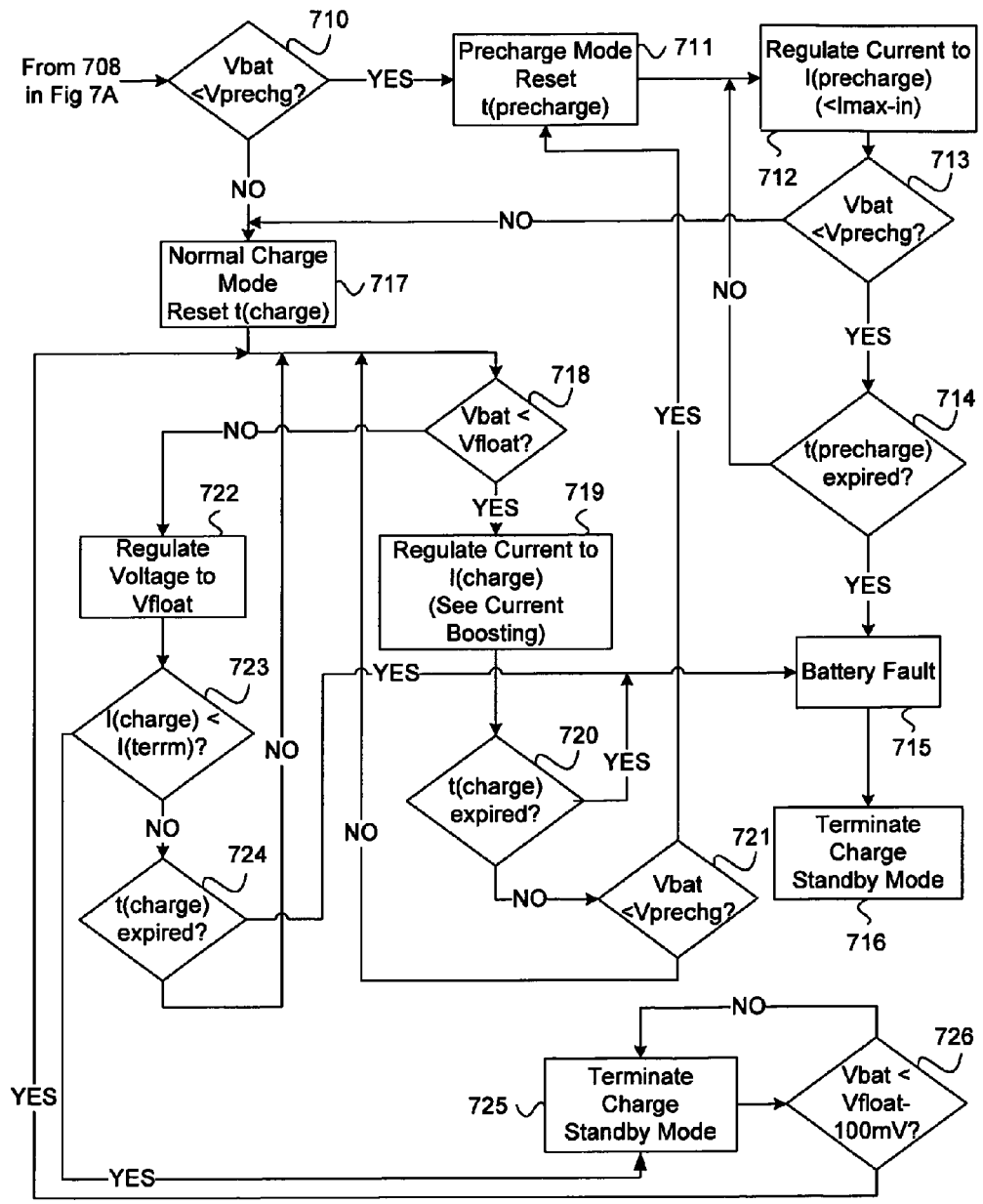

FIG. 7 is an example charge cycle according to one embodiment of the present invention. The present example may be used in an application where the input voltage is a USB power terminal, for example. In the following example, many of the charge cycle parameters are programmable according to the techniques described above, and may be configured and changed over a serial or parallel bus, for example. The charge cycle begins with a power on reset ("POR") 701. At 702, the input voltage is sensed or otherwise measured and compared against the battery voltage and an added offset. In this example, if the input voltage is less than the battery voltage plus 130 mV, then the system terminates charging and enters a standby mode at 703. If the input voltage is greater than the battery voltage plus 130 mV, then the temperature is sensed and checked at 704. If the temperature of the battery is determined to be outside an allowable range (i.e., T(hi)>T>T(lo)), then the system terminates charging. However, if the temperature of the battery is determined to be within an allowable range, then the charge cycle continues to 705. As mentioned above, the characteristics of the temperature check may be programmable. The following Tables 1-2 illustrate example programming of bias current for measuring battery temperature, and over-temperature and under-temperature parameters:

TABLE 1

| Bit 1 | Bit 0 | Thermistor Current |
|---|---|---|
| 0 | 0 | 100 μA (10 k NTC) |
| 0 | 1 | 40 μA (25 k NTC) |
| 1 | 0 | 10 μA (100 k NTC) |
| 1 | 1 | 0 μA (Disabled) |

TABLE 2

| Bit 2 | Bit 1 | Bit 0 | Low Temp | Bit 2 | Bit 1 | Bit 0 | High Temp |
|---|---|---|---|---|---|---|---|
| 0 | 0 | 0 | −20° C. | 0 | 0 | 0 | +30° C. |
| 0 | 0 | 1 | −15° C. | 0 | 0 | 1 | +35° C. |
| 0 | 1 | 0 | −10° C. | 0 | 1 | 0 | +40° C. |
| 0 | 1 | 1 | −5° C. | 0 | 1 | 1 | +45° C. |
| 1 | 0 | 0 | 0° C. | 1 | 0 | 0 | +50° C. |
| 1 | 0 | 1 | +5° C. | 1 | 0 | 1 | +55° C. |
| 1 | 1 | 0 | +10° C. | 1 | 1 | 0 | +60° C. |
| 1 | 1 | 1 | +15° C. | 1 | 1 | 1 | +65° C. |

In this example, the system is charging from a USB power supply input. Thus, the system defaults to 100 mA USB mode and waits for the USB controller to specify the USB type (i.e., HUB or HOST). A USB HOST can supply a maximum of 100 mA, whereas a USB HUB can supply a maximum of 500 mA. The system determines the USB host type at 706. For a USB HOST, the constant fast charge current will remain set at the default 100 mA level. For a USB HUB, the constant fast charge current is programmed to 500 mA maximum. For example, in one embodiment the system may include a first register storing a charge parameter for programming the precharge current from 25 mA to 212.5 mA in 12.5 mA steps. Another register may be used to program a fast charge current from 125 mA to 500 mA in 25 mA steps. When the system is in HOST mode, the system disables the fast charge register and constrains the bits provided from the precharge register to a DAC so that the output current cannot exceed 100 mA.

At 708, the system senses the battery voltage. In this example, the system may first compare the battery voltage to a programmable threshold at 708 for starting a "trickle charge." If the battery voltage is below 2.16V, a trickle current (e.g., 3 mA) may be generated and the timers turned off (i.e., no time out) at 709. According to one embodiment of the invention, the trickle charge threshold and constant trickle current are programmable by storing corresponding charge parameters. If the battery voltage increases above the trickle threshold, the system will generate a programmed constant precharge current and continue to monitor the battery voltage. As long as the voltage on the battery is below the precharge threshold at 710 the system will be in precharge mode at 711. As described above, the precharge threshold is programmable across a range of values. The following table illustrates different precharge thresholds that may be programmed by different charge parameter values (e.g., bits 0 . . . 2) in a programmable register or other programmable memory, for example.

TABLE 3

| Bit 2 | Bit 1 | Bit 0 | Pre-charge to Fast-charge Voltage Threshold |
|---|---|---|---|
| 0 | 0 | 0 | 2.4 V |
| 0 | 0 | 1 | 2.5 V |
| 0 | 1 | 0 | 2.6 V |
| 0 | 1 | 1 | 2.7 V |
| 1 | 0 | 0 | 2.8 V |
| 1 | 0 | 1 | 2.9 V |
| 1 | 1 | 0 | 3.0 V |
| 1 | 1 | 1 | 3.1 V |

At 712, the system starts a timer and generates a programmed constant precharge current. The following table illustrates different precharge currents that may be programmed by different charge parameter values (e.g., bits 0 . . . 3) in a programmable register or other programmable memory, for example.

TABLE 4

| Bit 3 | Bit 2 | Bit 1 | Bit 0 | Pre-charge current |
|---|---|---|---|---|
| 0 | 0 | 0 | 0 | 25 mA |
| 0 | 0 | 0 | 1 | 37.5 mA |
| 0 | 0 | 1 | 0 | 50 mA |
| 0 | 0 | 1 | 1 | 62.5 mA |
| 0 | 1 | 0 | 0 | 75 mA |
| 0 | 1 | 0 | 1 | 87.5 mA |
| 0 | 1 | 1 | 0 | 100 mA |
| 0 | 1 | 1 | 1 | 112.5 mA |
| 1 | 0 | 0 | 0 | 125 mA |
| 1 | 0 | 0 | 1 | 137.5 mA |
| 1 | 0 | 1 | 0 | 150 mA |
| 1 | 0 | 1 | 1 | 162.5 mA |
| 1 | 1 | 0 | 0 | 175 mA |
| 1 | 1 | 0 | 1 | 187.5 mA |
| 1 | 1 | 1 | 0 | 200 mA |
| 1 | 1 | 1 | 1 | 212.5 mA |

While the system is supplying a constant precharge current, the system senses the battery voltage at 713. If the battery voltage remains below the programmed precharge threshold, the system will continue supplying the precharge current and the timer will continue to operate. If the battery voltage remains below the precharge threshold when the timer expires at 714, the system will generate a battery fault at 715 and terminate the charge cycle at 716. The precharge timeout is also programmable. The following table illustrates different timeouts that may be programmed by different charge parameter values (e.g., bits 0 . . . 2) in a programmable register or memory:

TABLE 5

| Bit 1 | Bit 0 | Pre-charge Timeout |
|---|---|---|
| 0 | 0 | 2621 sec |
| 0 | 1 | 5242 sec |
| 1 | 0 | 10484 sec |
| 1 | 1 | Disabled |

When the precharge current increases the battery voltage above the precharge threshold, the system will switch to "normal" or "fast charge" mode at 717. In this mode, the system will reset a programmable fast charge timer and supply a programmed constant current, which has a maximum of 100 mA for a USB HUB or 500 mA for a USB HOST. The fast charge timer is also programmable as follows:

TABLE 6

| Bit 1 | Bit 0 | Fast-charge Timeout |
|---|---|---|
| 0 | 0 | 20972 sec |
| 0 | 1 | 41943 sec |
| 1 | 0 | 83886 sec |
| 1 | 1 | Disabled |

During fast charging, the voltage on the battery is again monitored at 718. While the voltage on the battery is less than the programmed float voltage ("Vfloat") the charging system will regulate the programmed constant current to the battery at 719. The following table illustrates fast charge currents that may be programmed for a USB HUB. USB HOST fast charge currents are limited to 100 mA max. This may be done by using the precharge register for precharge, and then reprogramming the register for a higher current during fast charge, for example.

TABLE 7

| Bit 3 | Bit 2 | Bit 1 | Bit 0 | Fast Charge Current |
|---|---|---|---|---|
| 0 | 0 | 0 | 0 | 125 mA |
| 0 | 0 | 0 | 1 | 150 mA |
| 0 | 0 | 1 | 0 | 175 mA |
| 0 | 0 | 1 | 1 | 200 mA |
| 0 | 1 | 0 | 0 | 225 mA |
| 0 | 1 | 0 | 1 | 250 mA |
| 0 | 1 | 1 | 0 | 275 mA |
| 0 | 1 | 1 | 1 | 300 mA |
| 1 | 0 | 0 | 0 | 325 mA |
| 1 | 0 | 0 | 1 | 350 mA |
| 1 | 0 | 1 | 0 | 375 mA |
| 1 | 0 | 1 | 1 | 400 mA |
| 1 | 1 | 0 | 0 | 425 mA |
| 1 | 1 | 0 | 1 | 450 mA |
| 1 | 1 | 1 | 0 | 475 mA |
| 1 | 1 | 1 | 1 | 500 mA |

If the fast charge timer expires at 720 before the voltage on the battery reaches the float threshold at 721, the system will issue a battery fault at 715 and terminate the charge cycle at 716. However, if the battery voltage increase to the programmed float voltage before the timer expires, the system will transition to constant voltage regulation mode and set a constant voltage timer. The float voltage provided to the battery is also set by programming instructions. The following table illustrates available float voltages that may be programmed. From the table below it can be seen that a range of voltages may be programmed at the output of the charger. Thus, a variety of batteries or battery conditions may be accommodated by battery chargers using the techniques disclosed herein.

TABLE 8

| Bit 4 | Bit 3 | Bit 2 | Bit 1 | Bit 0 | Float Voltage |
|---|---|---|---|---|---|
| 0 | 0 | 0 | 0 | 0 | 4.000 V |
| 0 | 0 | 0 | 0 | 1 | 4.020 V |
| 0 | 0 | 0 | 1 | 0 | 4.040 V |
| 0 | 0 | 0 | 1 | 1 | 4.060 V |
| 0 | 0 | 1 | 0 | 0 | 4.080 V |
| 0 | 0 | 1 | 0 | 1 | 4.100 V |
| 0 | 0 | 1 | 1 | 0 | 4.120 V |
| 0 | 0 | 1 | 1 | 1 | 4.140 V |
| 0 | 1 | 0 | 0 | 0 | 4.160 V |
| 0 | 1 | 0 | 0 | 1 | 4.180 V |
| 0 | 1 | 0 | 1 | 0 | 4.200 V |
| 0 | 1 | 0 | 1 | 1 | 4.220 V |
| 0 | 1 | 1 | 0 | 0 | 4.240 V |
| 0 | 1 | 1 | 0 | 1 | 4.260 V |
| 0 | 1 | 1 | 1 | 0 | 4.280 V |
| 0 | 1 | 1 | 1 | 1 | 4.300 V |
| 1 | 0 | 0 | 0 | 0 | 4.320 V |
| 1 | 0 | 0 | 0 | 1 | 4.340 V |
| 1 | 0 | 0 | 1 | 0 | 4.360 V |
| 1 | 0 | 0 | 1 | 1 | 4.380 V |
| 1 | 0 | 1 | 0 | 0 | 4.400 V |
| 1 | 0 | 1 | 0 | 1 | 4.420 V |
| 1 | 0 | 1 | 1 | 0 | 4.440 V |
| 1 | 0 | 1 | 1 | 1 | 4.460 V |
| 1 | 1 | 0 | 0 | 0 | 4.480 V |
| 1 | 1 | 0 | 0 | 1 | 4.500 V |
| 1 | 1 | 0 | 1 | 0 | 4.520 V |
| 1 | 1 | 0 | 1 | 1 | 4.540 V |
| 1 | 1 | 1 | 0 | 0 | 4.560 V |
| 1 | 1 | 1 | 0 | 1 | 4.580 V |
| 1 | 1 | 1 | 1 | 0 | 4.600 V |
| 1 | 1 | 1 | 1 | 1 | 4.620 V |

While the voltage at the output is maintained at the programmed float voltage, the current into the battery will begin to taper off (decrease). The charging system monitors the current at 723, and if the current into the battery during constant voltage regulation decreases below a programmed termination current threshold, the system will terminate the charge cycle at 725. Alternatively, if the current into the battery remains above the programmed termination threshold longer than the programmed constant voltage timer at 724, then the system may time out at 724, generate a battery fault at 715, and terminate the charge cycle at 716. If the current falls below the programmed termination current threshold before the timer expires, then the charger will terminate the charge cycle and transition to a standby mode at 725. While in standby mode, the system will monitor the battery voltage, and if the battery voltage falls below a predefined level (e.g., 100 mV below the programmed float voltage), then the system may enter a "top off" cycle.

Figure 8:
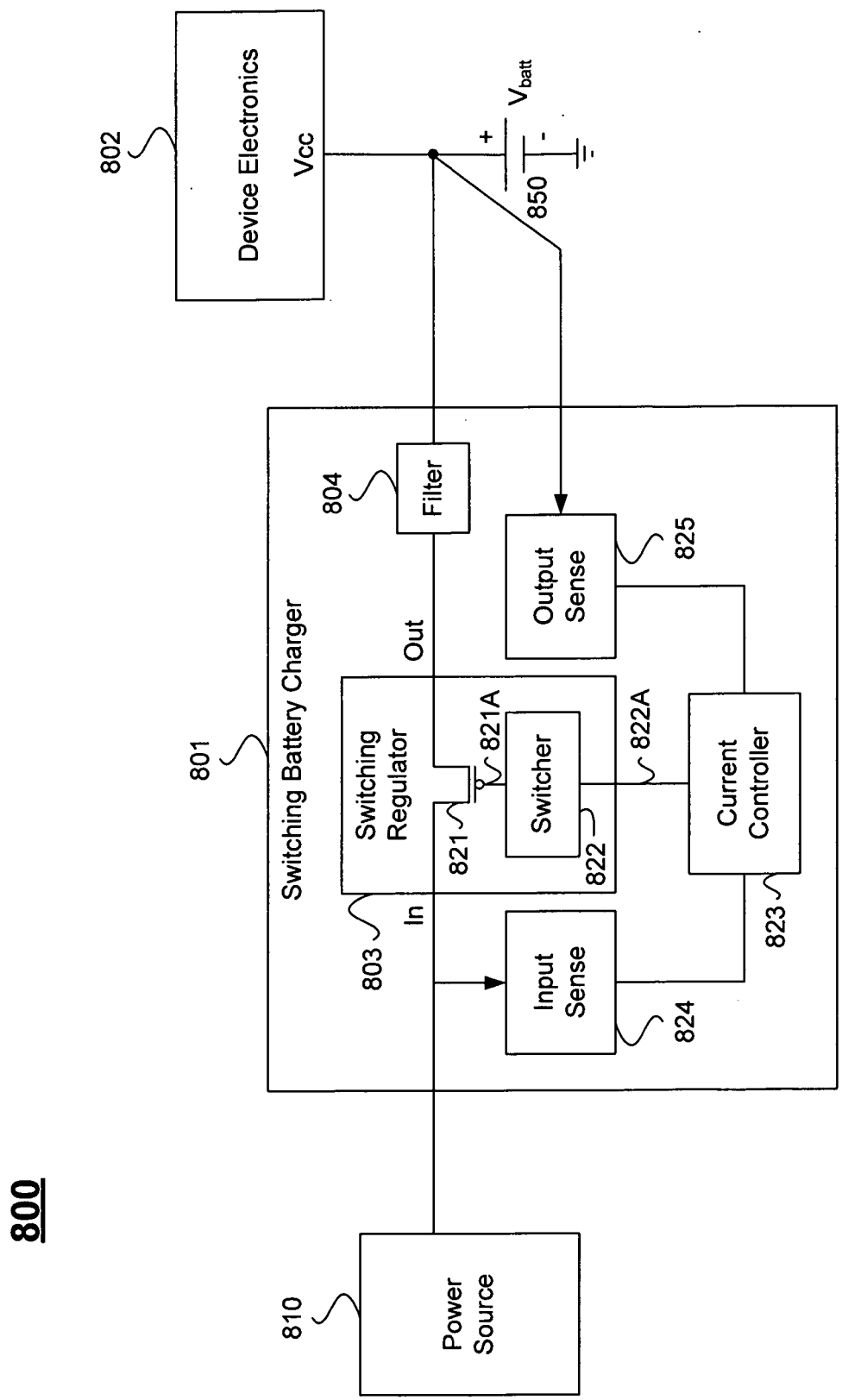
FIG. 8 illustrates a switching battery charger including a switching regulator according to one embodiment of the present invention.

FIG. 8 illustrates a switching battery charger 801 including a switching regulator 803 according to one embodiment of the present invention. Device electronics 802 includes a power supply terminal ("Vcc") that receives power from battery 850. When the battery 850 is depleted, it may be recharged by coupling voltage and current from a power source 810 to the battery 850 through a switching regulator 803 and filter 804. For example, as mentioned above the power source may be a DC power source from a USB port, for example. It is to be understood that the techniques described herein may also be applied to AC power sources. Thus, FIG. 8 is one example system using DC power. Switching regulator 803 may include a switching device 821, a switching circuit ("switcher") 822, an adjustable current controller 823, an output sense circuit 825, and an input sense circuit 824. Switching regulator 803 is distinguished from a linear regulator in that switching regulator 803 includes a switching circuit 822 that generates a switching control signal 822A at the control terminals of transistor 821. For example, the switching device 821 may be a PMOS transistor. However, it is to be understood that the switching device may be implemented using other types of devices such as one or more bipolar or MOS transistors, for example.

In current control mode, output sense circuit 825 senses the output current into the battery. Current controller 823 is coupled to output sense circuit 825 for controlling the output current. Current controller 823 receives inputs from output sense circuit corresponding to the output current. Current controller 823 uses these inputs to control switching circuit 822, which in turn provides signals to the control terminal of switching device 821 that modify the output current. An example switching control scheme may include pulse width modulating the control terminal of switching device 821. The output of switching regulator 803 is coupled through a filter 804 to a terminal of battery 850. Voltages or currents at the battery terminal may be controlled by sensing the battery voltage or current into the battery. In current control mode, current controller 823 may receive the sensed battery current and modify control signal 822A to change the behavior of switching circuit 822 and switching device 821 to maintain the battery current at a controlled value. Similarly, in voltage control mode, a voltage controller (described below) may receive the sensed battery voltage, and modify control signal 822A to change the behavior of switching circuit 822 and switching device 821 to maintain the battery voltage at a controlled value. Accordingly, the voltages or currents into the battery can be maintained at controlled values. As described in more detail below, current controller 823 may include another input coupled to either the voltage on the battery or the input current to the switching regulator to control modification of the battery current as the voltage on the battery increases. Since either battery voltage or input current may be used for this purpose, the system may or may not include an input sense circuit 824.

In one embodiment, switching regulator 803 receives a voltage and current from power source 810 and provides a charge current to the battery that is greater than the current received from the power source. For example, if the voltage received from the power source is greater than the battery voltage, then the switching regulator can provide a charge current into the battery that is greater than the input current to the switching regulator. When the voltage at the input of the switching regulator is greater than the voltage on the battery (sometimes referred to as a "Buck" configuration), the "ideal" voltage-current relationship of the switching regulator is given as follows:

$$V\text{out}=C*V\text{in; and}$$

$$I\text{out}=I\text{in}/C,$$

where C is a constant. For example, in a pulse width modulated switching regulator, C is the "Duty Cycle," D, of the switching waveform at the control input of the switching device(s). The above equations illustrate that the output current is a function of the input current, input voltage, and output voltage as follows:

$$I\text{out}=I\text{in}*(V\text{in}/V\text{out}).$$

It is to be understood that the above equations apply to an "ideal" buck regulator. In an actual implementation, the output is derated for non-idealities (i.e., efficiency losses), which may be around 10% (i.e., efficiency, η=90%). The above equations illustrate that the charge current into battery 850 may be larger than the input current (i.e., where the input voltage Vin is greater than the output voltage). Moreover, at the beginning of a charge cycle, the battery voltage is less than at a point in time later in the charge cycle. Thus, at the beginning of the charge cycle the current into the battery may be larger (i.e., when Vin/Vbatt is larger; where Vbatt=Vout) than the current into the battery at later points of time in the charge cycle (i.e., when Vin/Vbatt is smaller). In one embodiment, the current into the battery (i.e., the output current of the switching regulator) is controlled and set to an initial value, and as the battery voltage increases, the output current is reduced. The above equations illustrate that as the battery voltage increases, the current into the switching regulator will start to increase for a given current at the output of the switching regulator. This effect results from the voltage-current relationships on the switching regulator shown above. For example, if Iout and Vin are fixed, then Iin must increase as Vout increases. Accordingly, different embodiments may sense the output voltage or input current, and reduce the current into the battery as the battery voltage increases.

For example, switching regulator 803 may operate in a current control mode, wherein the output sense circuit 825 senses the output current of the switching regulator (i.e., the battery input current), and current controller 823 controls the reduction of current into the battery as the voltage on the battery increases. In one embodiment, current controller 823 may reduce the battery current in response control signals corresponding to an increasing battery voltage, which signal current controller 823 to reduce the battery current. In another embodiment, input sense circuit 824 senses the input current to the switching regulator, and current controller 823 reduces the current into the battery in response to control signals corresponding to an increasing input current. Equivalently, other parameters related to the input current or battery voltage could be monitored to obtain the desired information for adjusting the current into the battery. In one embodiment, a controller (described in more detail below) is used for generating one or more control signals to the current controller in response to the first input current or first output voltage. A controller is a circuit that receives the sensed parameter (e.g., input current or battery voltage as an analog or digital signal) and generates one or more control signals to current controller 823 to adjust the current at the output. Sense circuits, controllers and current controllers may be implemented as analog circuits (in whole or in part) so that the switching regulator output current (i.e., the battery charging current) is reduced continuously as the switching regulator output voltage on the battery increases. In another embodiment, the controllers and/or current controllers may be implemented as digital circuit (in whole or in part) so that the battery charging current is reduced incrementally as the battery voltage increases. Examples of these circuits are described below.

Figure 9:
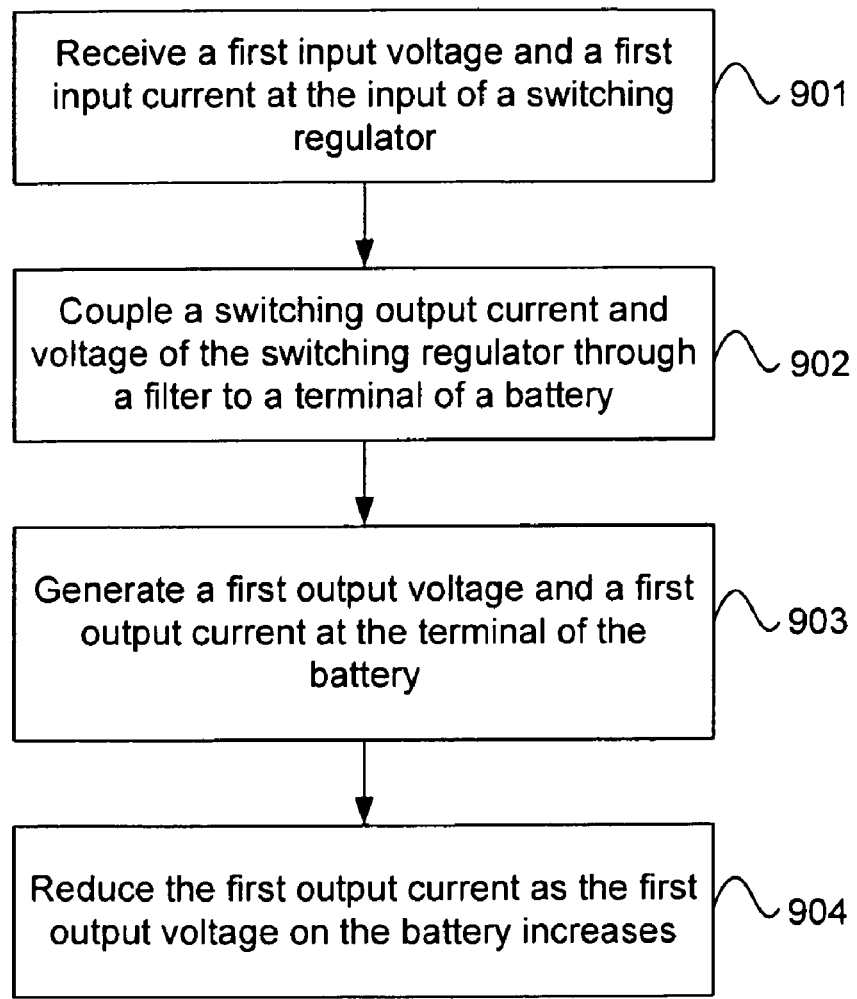
FIG. 9 illustrates charging a battery using a switching regulator according to one embodiment of the present invention.

FIG. 9 illustrates charging a battery using a switching regulator according to one embodiment of the present invention. At 901, an input voltage and an input current are received at the input of a switching regulator. At 902, a switching output current and voltage at the output of the switching regulator are coupled to the terminal of a battery. For example, an output terminal of a switching transistor may be coupled through a filter to the battery terminal. At 903, an output voltage (i.e., the battery voltage) and output current (i.e., battery input current) are generated at the output of the switching regulator. At 904, the current into the battery is reduced as the output voltage on the battery increases. As mentioned above, the switching regulator may detect the rise in the battery voltage by sensing either the battery voltage directly, the input current, or other related parameters.

Figure 10A:
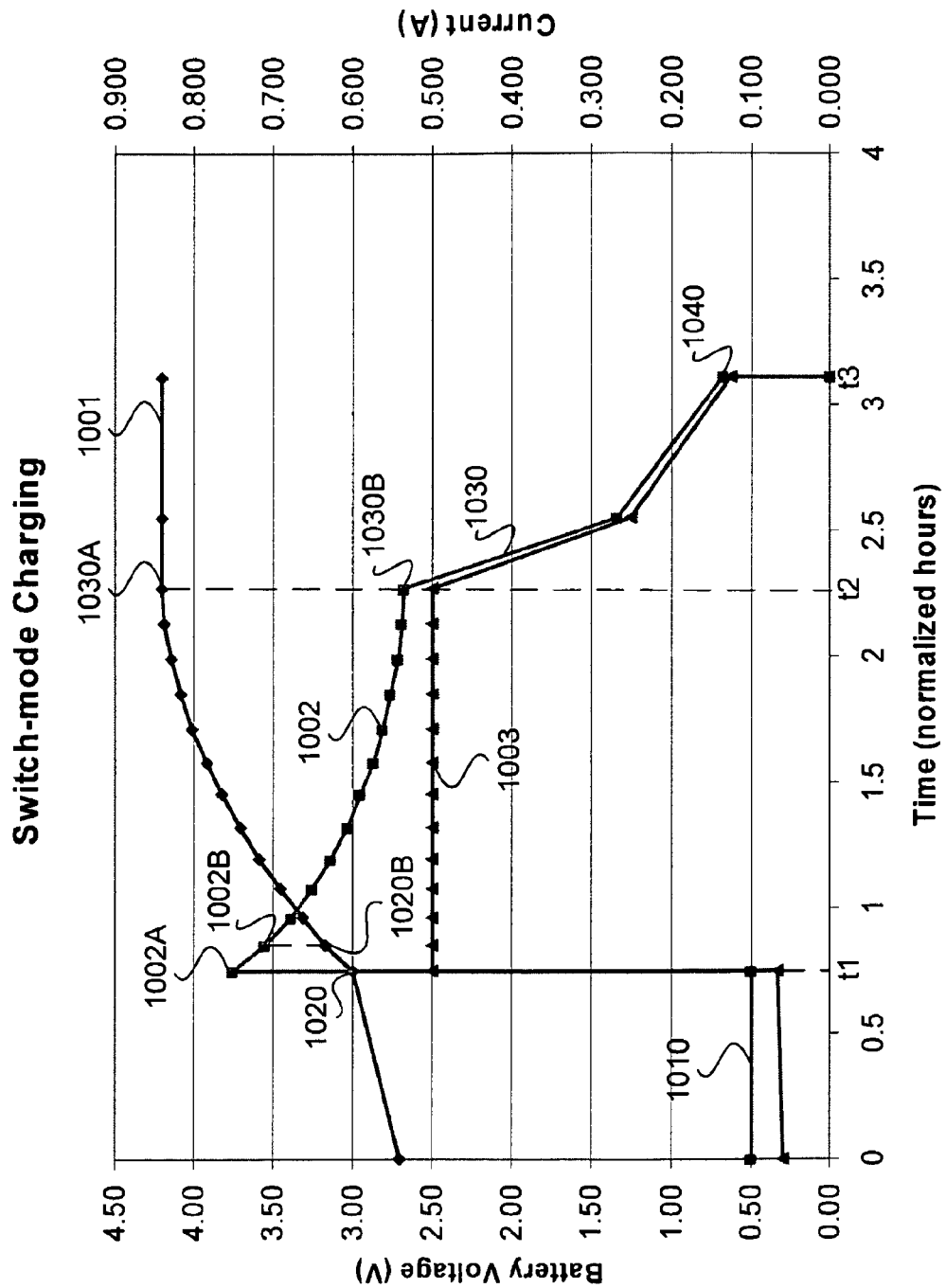
FIGS. 10A-B illustrate charging a battery using a switching regulator according to embodiments of the present invention.
Figure 10B:
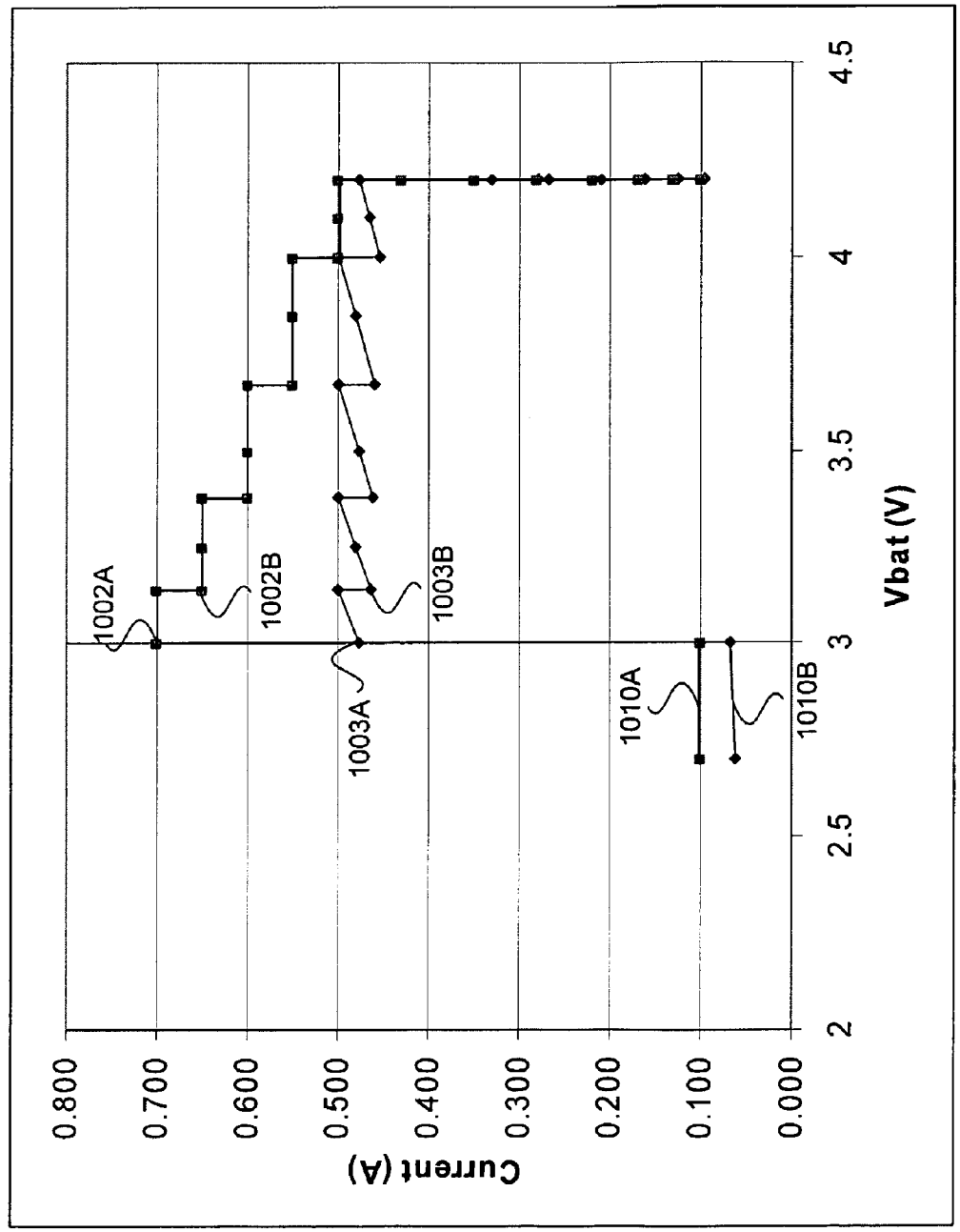

FIGS. 10A-B illustrate charging a battery using a switching regulator according to embodiments of the present invention. The graph in FIG. 10A shows the current plotted on the right vertical axis and the voltage on the battery on the left vertical axis versus time on the horizontal axis. Voltage on the battery over time is shown by the line 1001, current into the battery is shown by the line 1002, and current into the switching regulator is shown by the line 1003. This example illustrates a charge cycle for charging a deeply depleted Li+ battery. The battery is charged in two basic modes: a current control mode (t=0, t2) and a voltage control mode (t=t2, t3). In this example, the voltage on the battery is initially below some particular threshold (e.g., 3 volts), indicating that the battery is deeply depleted. Accordingly, the current control mode may initially generate a constant precharge current 1010 (e.g., 100 mA). The constant precharge current 1010 will cause the battery voltage to start to increase. When the battery voltage increases above a precharge threshold 1020 (e.g., 3 volts), the system will increase the current sourced to the battery. The second current is sometimes referred to as the "fast charge" current.

As shown in FIG. 10A, the current into the battery may be larger than the current received by the switching regulator. For example, at the beginning of the fast charge cycle, the current into the battery may be initially set at 750 mA, whereas the current into the switching regulator is 500 mA. Accordingly, the voltage on the battery will begin to increase as the battery is charged. As the battery voltage increases, the current into the battery may be reduced so that the input current remains approximately constant. As mentioned above, if the voltage on the battery increases, and if the current supplied by the switching regulator remains constant, the current into the switching regulator will begin to increase. In some applications it may be desirable to maintain the input current below some threshold values so that the total power into the switching regulator does not exceed the total power available at the power source. For example, if the power source is a USB port, then the maximum current may be either 100 mA or 500 mA, depending on the USB port type (HOST or HUB). In this example, the input current is maintained approximately constant and the current into the battery is reduced as the battery voltage increases. For instance, when the battery voltage increases above 3 volts at 1020B, the current into the battery is reduced to about 700 mA. From FIG. 10A it can be seen that the current is successively decreased as the voltage on the battery increases to maintain the input current approximately constant. As mentioned above, either analog or digital techniques may be used to control the battery current. Additionally, the system may sense either the input current to the switching regulator or battery voltage to implement battery current control.

When the voltage on the battery increases above a threshold 1030A at time t2, the system may automatically transition to provide a constant voltage to the battery (i.e., the "float" voltage). When the battery increases to the float voltage during current control mode, the system will transition into voltage control mode and maintain the float voltage at the battery. While the system is in voltage control mode, the current 1030 into the battery will begin to decrease (i.e., "taper" or "fall off"). In some embodiments, it may be desirable to turn off the charger after the current reaches some minimum threshold 1040. Thus, when the battery current falls below a minimum value, the system may automatically shut down the charger and end the charge cycle at time t3.

FIG. 10B illustrates the input current to a switching regulator and the battery current provided by the switching regulator versus battery voltage. The graph in FIG. 10B shows the current plotted on the left vertical axis and battery voltage on the horizontal axis. Initially, the battery voltage is below some threshold (e.g., 3 volts), the system is in precharge mode, and the switching regulator is set to provide a constant precharge current 1010A (e.g., 100 mA) to the battery. Accordingly, the input current 1010B is less than battery current (e.g., <100 mA). When the system transitions into fast charge mode (e.g., as a result of the battery voltage increases above some threshold value, such as 3 volts), the battery current may be reset from a precharge value to a maximum value 1002A (e.g., 700 mA). When the current supplied to the battery from the switching regulator is increased, the input current is similarly increased to a new value 1003A (e.g., about 475 mA). However, as the battery voltage increases above the threshold, the input current will increase if the output current is held constant. In some applications, the power source, such as a USB power source, may not be able to supply input current to the switching regulator above some maximum value (e.g., 500 mA for USB). The maximum input value may be taken into consideration when setting the current into the battery. Accordingly, when the input current increases to some threshold value (e.g., a maximum allowable level such as 500 mA), the system may reset the battery current to a new value 1002B less than the previous value so that the input current is accordingly reduced below the threshold at 1003B (e.g., about 450 mA). The output current into the battery may be reduced incrementally as the output voltage on the battery increases so that the input current remains below a threshold as shown in FIG. 10B. In one embodiment, the output current is reduced incrementally in response to sensing the input current to the switching regulator, and determining that the input current has increased above a threshold. In another embodiment, the output current is reduced incrementally in response to sensing the battery voltage.

Figure 11:
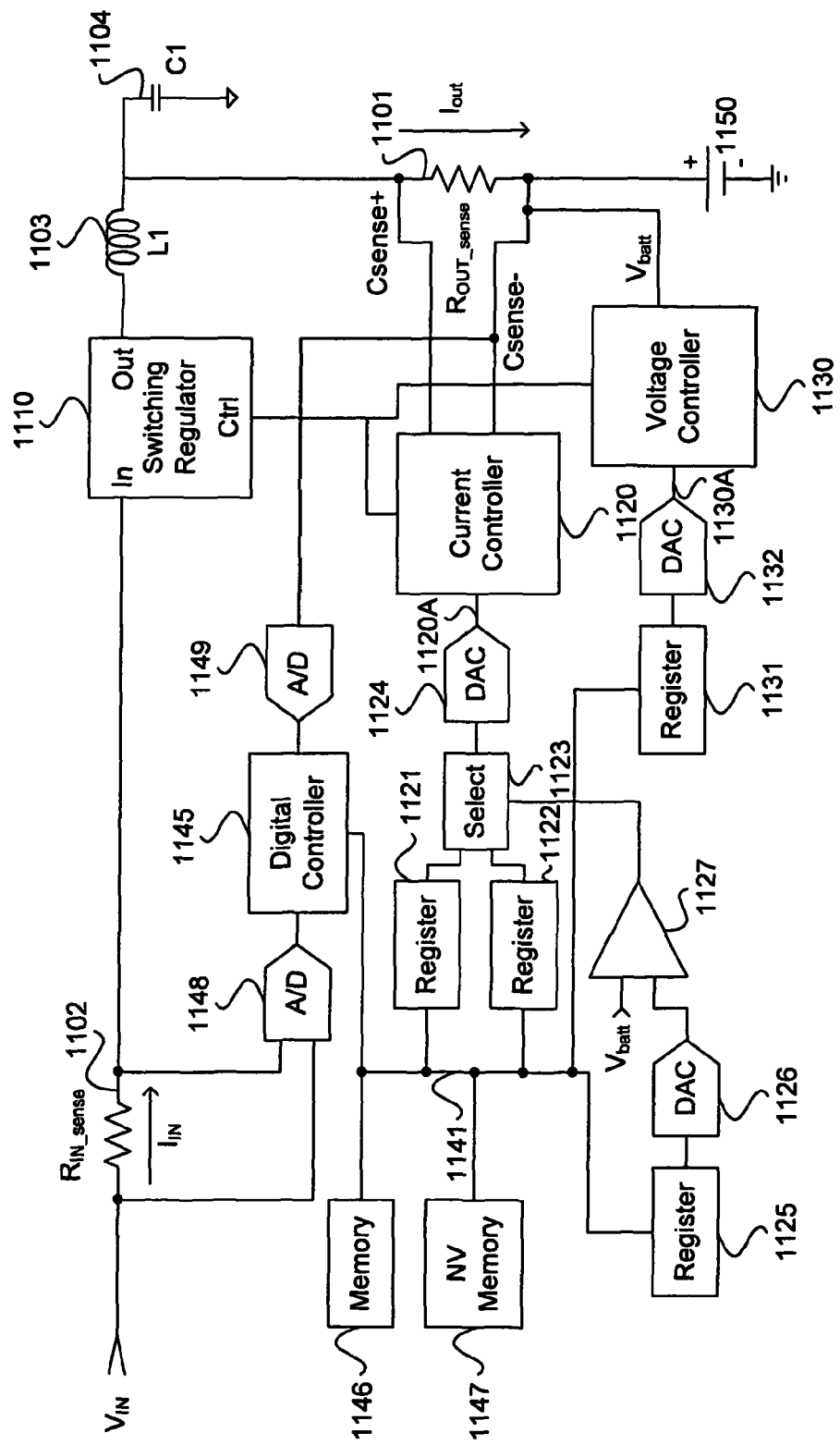
FIG. 11 illustrates an example implementation of a battery charging system according to one embodiment of the present invention.

FIG. 11 illustrates an example implementation of a battery charging system 1100 according to one embodiment of the present invention. This example illustrates one possible implementation using a digital controller 1145 and programmable storage for adjusting the battery current as the battery voltage increases. Battery charger 1100 includes a switching regulator 1110 having an input for receiving input voltage and current from a power source. The output of switching regulator 1110 is coupled to battery 1150 through a filter comprising an inductor 1103 and capacitor 1104. A current sense resistor 1101 may also be included in the current path to the battery. A current controller 1120 has a first input coupled to a first terminal of current sense resistor 1101 and a second input coupled to a second terminal of current sense resistor 1101 for sensing the battery current. In current control mode, current controller 1120 receives the sensed battery current and provides a control signal to a control input of switching regulator 1110. In this example, current controller 1120 is an adjustable current controller, and includes a control input 1120A that receives control signals for adjusting the output current generated by the switching regulator. System 1100 further includes a voltage controller 1130 for the voltage control mode of a charge cycle. Voltage controller 1130 includes a first input coupled to the terminal of the battery for sensing battery voltage. In voltage control mode, the output of voltage controller 1130 generates a control signal to switching regulator 1110. In this example, voltage controller 1130 is an adjustable voltage controller, and includes a control input 1130A for adjusting the output current generated by the switching regulator. Charging system 1100 further includes data storage coupled to current controller 1120 and voltage controller 1130 for configuring the switching regulator in current control and voltage control modes as described above.

In this example, a digital controller 1145 is used to modify the control input of current controller 1120 to change the battery current as the voltage on the battery increases. In one embodiment, a sense circuit (e.g., an input sense resistor 1102) may be used to sense the switching regulator's input current. In this example, the input sense resistor 1102 is the means for sensing the first input current received by the switching regulator. Equivalent sensing means may include transistor or inductive sense techniques, for example. The terminals of resistor 1102 are coupled to digital controller 1145 through an analog-to-digital ("A/D") converter 1148. In another embodiment, the voltage on the battery may be coupled to digital controller 1145 through A/D 1149. A variety of techniques may be used for A/Ds and DACs. In this example, the DAC 1124, register 1122, digital controller 1145, and either A/D 1148 or A/D 1149 comprise the means for generating the control signal to the current controller in response to the first input current or first output voltage. It is to be understood that other sense and control circuit techniques may be used, and that the resistor sensing, A/Ds, registers, and DACs are just an example. Controller 1145 receives the sensed input current or output voltage and adjusts current controller 1120 to control the battery current as described above. For example, digital controller 1145 may be used to program data storage elements with charging parameters, which, in turn, are converted to analog signals and coupled to the control input 1120A of current controller 1120. The charging parameters in data storage may be programmed through controller 1145 using a digital bus 1141 (e.g., a serial or parallel bus), for example. Accordingly, the charging parameters may be changed under control of a predefined software algorithm. Controller 1145 may be included on the same integrated circuit as the switching regulator and switching battery charger circuitry, or controller 1145 may be included on another integrated circuit in the electronic device. In one embodiment, the digital bus may be coupled to or implemented using an I²C bus or Universal Serial Bus ("USB"), for example.

As the battery voltage increases, digital controller 1145 may reprogram register 1122 to change the battery current. For example, digital controller 1145 may compare the battery voltage against a threshold (either in software or in hardware), and reprogram register 1122 if the battery voltage is above the threshold. As the battery voltage increases, controller 1145 may compare the battery voltage against different thresholds to change the output current. The thresholds may be linearly spaced apart, for example, or determined according to particular system requirements. Alternatively, digital controller 1145 may compare the regulator input current against a threshold (either in software or in hardware), and reprogram register 1122 if the input current is above the threshold.

Figure 12:
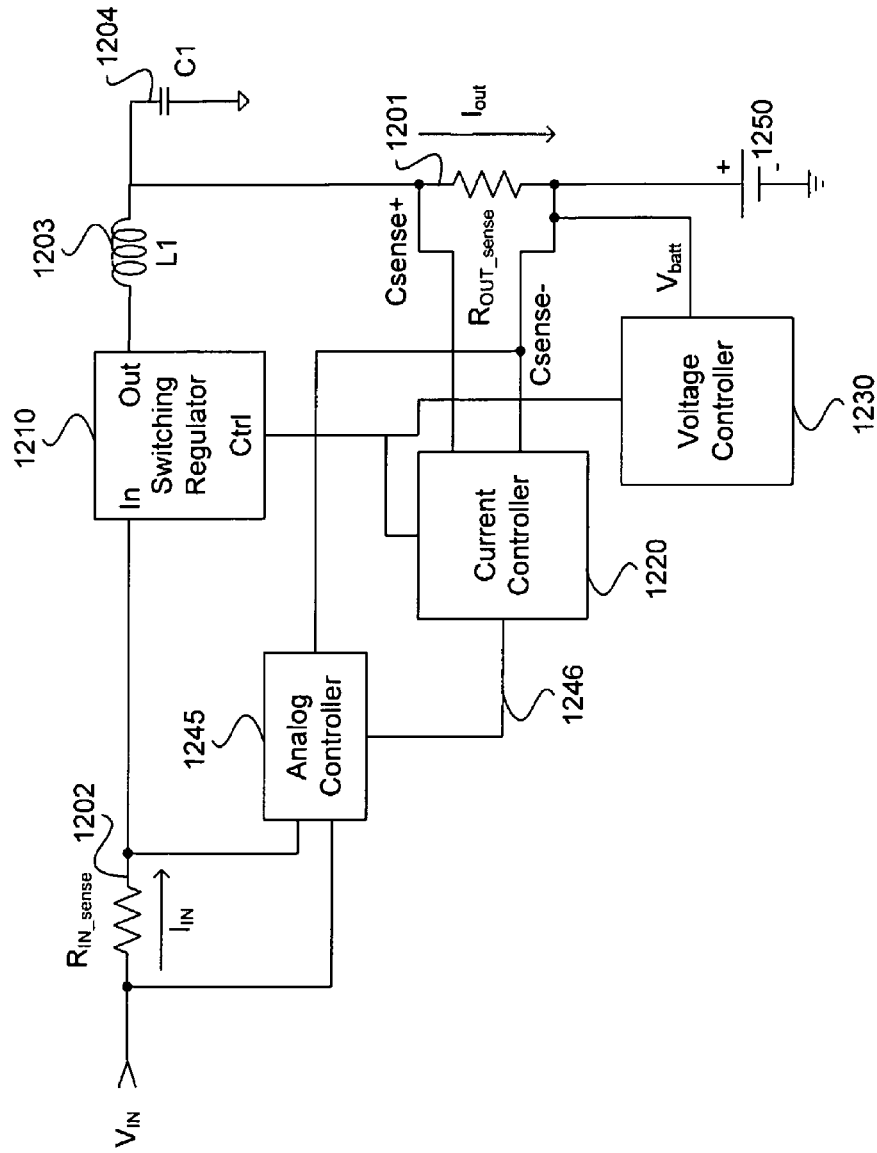
FIG. 12 illustrates an example implementation of a battery charging system according to one embodiment of the present invention.

FIG. 12 illustrates an example implementation of a battery charging system 1200 according to one embodiment of the present invention. This example illustrates one possible implementation using analog controller 1245 for adjusting the battery current as the battery voltage increases. Battery charger 1200 includes a switching regulator 1210 having an input for receiving voltage and current from a power source. The output of switching regulator 1210 is coupled to battery 1250 through a filter comprising an inductor 1203 and capacitor 1204. As described for battery charging system 1100 in FIG. 11, in current control mode, current controller 1220 senses the output current and provides a control signal to a control input of switching regulator 1210 for controlling the current sourced to the battery. In this example, a current sense resistor 1201 is included in the current path to the battery, and current controller 1220 has a first input coupled to a first terminal of current sense resistor 1201 and a second input coupled to a second terminal of current sense resistor 1201 for sensing the battery current. As in charger 1100 in FIG. 11, current controller 1220 is an adjustable current controller, and includes a control input 1246 that receives control signals for adjusting the output current generated by the switching regulator. System 1200 further includes a voltage controller 1230 for the voltage control mode of a charge cycle. Voltage controller 1230 includes a first input coupled to the terminal of the battery for sensing battery voltage. In voltage control mode, the output of voltage controller 1230 generates a control signal to switching regulator 1210.

In this example, analog controller 1245 provides the means for generating the control signal to the current controller in response to the first input current or first output voltage. Analog controller 1245 may be coupled to either the battery terminal for sensing the battery voltage or to an input current sense circuit for sensing input current to the switching regulator. In this example, the input current sense circuit is a current sense resistor 1202 coupled to the input of switching regulator 1210. In this example, analog controller 1245 may have an input coupled to the battery, or analog controller 1245 may include two inputs coupled across sense resistor 1201. In response to either the sensed input current or battery voltage, analog controller modifies one or more control signals on the control input 1246 of current controller 1220 to change the battery current. Analog controller 1245 may use a variety of different input or output circuit techniques to sense the input current or battery voltage and generate the proper signal or signals depending on the particular implementation of current controller 1220. For example, analog controller 1245 may include amplifiers, current sources, limiters, and/or comparison circuits, for example, for processing the sensed voltages or currents and generating one or more control signals on control input 1246 to current controller 1220 to adjust the battery current. It is to be understood that a variety of sensing circuits and analog circuits may be used. Thus, the battery current generated in current control mode may be adjusted by analog controller 1245 in response to either the sensed battery voltage input or the sensed input current. Accordingly, current controller 1220 may generate a current into the battery that is greater than the current into the switching regulator as described above. Current controller 1220 may sense the input current to the battery and the control signal from analog controller 1245, and the battery current may be reduced as the voltage on the battery increases.

Figure 13:
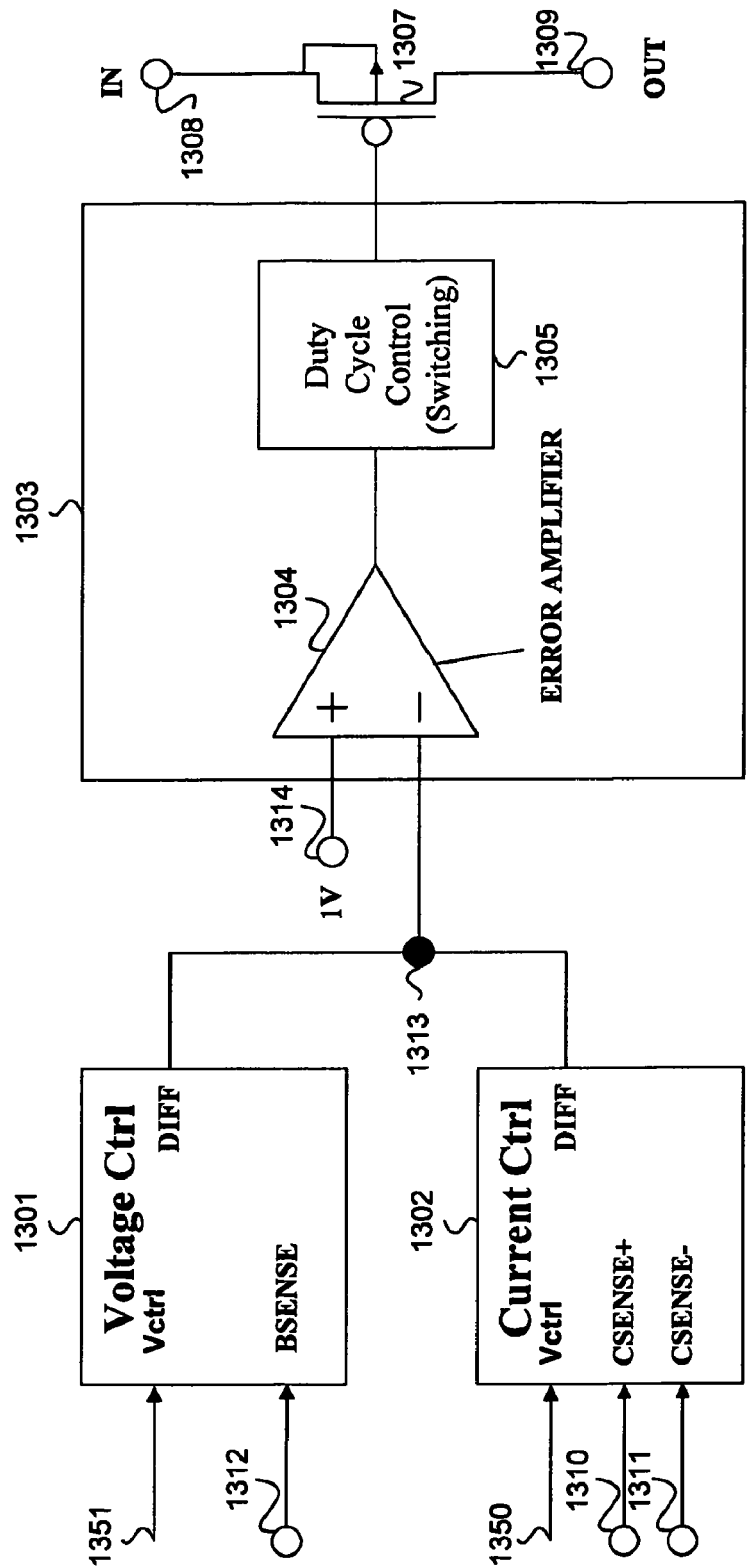
FIG. 13 is an example of a battery charger according to one embodiment of the present invention.

FIG. 13 is an example of a battery charger according to one embodiment of the present invention. Battery charger 1300 includes a voltage controller 1301, a current controller 1302, and a switching regulator 1303 coupled to a transistor 1307 (e.g., a PMOS transistor) for controlling the voltage and current coupled between an input terminal 1308 and an output terminal 1309. Current controller 1302 includes a first input terminal 1310 and a second input terminal 1311 for sensing the current through an output current sense resistor (e.g., 0.1 Ohm Resistor). Terminal 1310 is coupled to the positive terminal of the resistor, which is coupled to terminal 1309 of transistor 1307, and terminal 1311 is coupled to the negative terminal of the resistor, which is coupled to a battery (in a switching regulator, terminal 1309 is coupled to an inductor, and the other terminal of the inductor may be coupled to terminal 1310). Current controller 1302 further includes a control input 1350 for controlling the amount of current generated by the switching regulator in response to the current sensed between terminals 1310 and 1311. The output of current controller 1302 is coupled to the input of regulator 1303. Voltage controller 1301 includes a battery sense input terminal 1312, which is coupled to the battery, and a control input 1351, which may be coupled to a DAC, for example. The output of voltage controller 1301 is also coupled to the input of switching regulator 1303. Switching regulator 1303 may include an error amplifier 1304 having a first input coupled to a reference voltage 1314 (e.g., 1 volt) and a second input terminal coupled to the output of the voltage controller 1301 and current controller 1302. The output of error amplifier 1304 is coupled to the input of a switching circuit 1305, such as a duty cycle control input of a pulse width modulation ("PWM") circuit, for example. It is to be understood that a variety of switching techniques could be used to practice the present invention. Node 1313 is a negative feedback node of the regulator. Thus, under either current control or voltage control, the loop will drive node 1313 to the same voltage as the reference voltage of the error amplifier (e.g., 1 volt).

Figure 14:
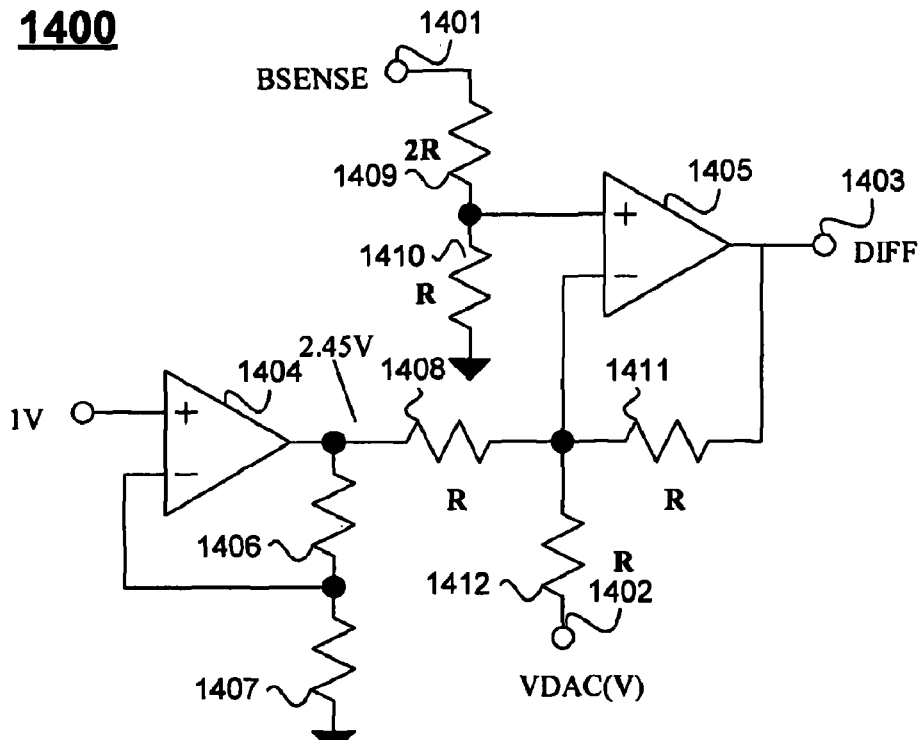
FIG. 14 is an example of a constant voltage control circuit according to one embodiment of the present invention.

FIG. 14 is an example of a voltage controller according to one embodiment of the present invention. Voltage controller 1400 is just one example of a control circuit that may be used to practice different embodiments of the invention. In this example, a battery sense terminal 1401 is coupled to a battery to be charged. A second input terminal 1402 is coupled to a control input (e.g. the output of a digital to analog converter) ("Vctrl") for setting the voltage at the battery terminal to a programmed voltage value. Terminal 1402 may be coupled through the Vctrl to a register or memory that stores a charging parameter to set the voltage at the battery. The battery voltage may be adjusted by changing the charging parameter, thereby changing the voltage at terminal 1402 across a range of different values. For example, as mentioned above, the output of the voltage controller 1400, DIFF, will be driven to the same voltage as the error amplifier reference, which is 1 volt in this example. A differential summing network including amplifiers 1404 and 1405 and the network of resistors 1406-1412 establish the following relation between the voltage at the output, DIFF, the battery voltage, BSENSE, and the voltage, Vctrl:

$$DIFF=BSENSE-(2.45V+Vctrl).$$

Thus, when DIFF is driven to 1 volt by the feedback loop, the battery voltage is a function of the voltage on Vctrl.

$$BSENSE=3.45+Vctrl; \text{ when DIFF}=1 \text{ volt.}$$

Accordingly, the battery voltage may be programmed by changing the digital values of bits coupled to the input of a DAC that sets Vctrl.

Figure 15:
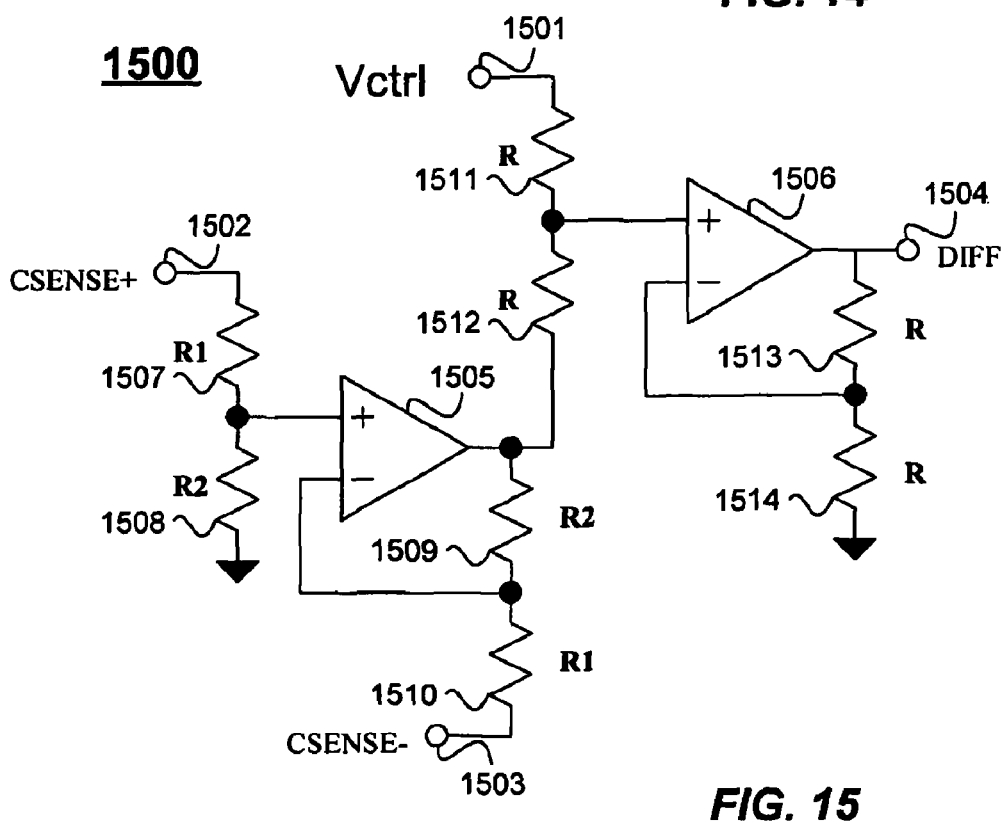
FIG. 15 is an example of a constant current control circuit according to one embodiment of the present invention.

FIG. 15 is an example of a current controller according to one embodiment of the present invention. Current controller 1500 is just one example of a control circuit that may be used to practice different embodiments of the invention. In this example, positive and negative current sense terminals 1502-1503 are coupled across a sense resistor at the input of a battery to be charged. Control input terminal 1501 is coupled to a control voltage ("Vctrl") for setting the controlled current into the battery in response to a digital or analog controller. For example, Vctrl may receive an analog voltage from an analog circuit that is responsive to either the output voltage or input current for reducing the battery current as the battery voltage increases. Alternatively, terminal 1501 may be coupled through a digital-to-analog converter ("DAC") to a register or memory that stores a charging parameter to set the current into the battery. The battery current may be adjusted by a digital controller in response to either the battery voltage or input current by changing a charging parameter, thereby changing the voltage at terminal 1501 across a range of different values. As an example, as mentioned above, the output of the current controller 1500, DIFF, will be driven to the same voltage as the error amplifier reference, which is 1 volt in this example. A differential summing network including amplifiers 1505 and 1506 and the network of resistors 1507-1514 establish the following relation between the voltage at the output, DIFF, the battery current as measured by voltages, CSENSE+ and CSENSE−, and the control voltage:

$$DIFF=R2/R1(CSENSE+-CSENSE-)+Vctrl.$$

Thus, when DIFF is driven to 1 volt by the feedback loop, the battery current is a function of the voltage on Vctrl.

$$(CSENSE+-CSENSE-)=(1V-Vctrl)/5; \text{ when DIFF}=1 \text{ volt and } R2/R1=5.$$

Accordingly, the current supplied to the battery by the switching regulator may be changed by changing the control voltage (e.g., by changing the digital values of bits coupled to the input of the DAC). While the above circuits in FIGS. 13-14 use differential summing techniques, it is to be understood that other current and/or voltage summing techniques could be used to sense the output battery current and voltage and generate control signals to drive the control input of a switching regulator.

Referring to FIGS. 13-15, one feature of the present invention may include connecting the outputs of the current controller and the voltage controller to the switching regulator using a "wired-OR" configuration. For example, in one embodiment, the output pull-down transistor of amplifier 1405 in the voltage controller 1400 and the output pull-down transistor of amplifier 1506 in the current controller 1500 are "weak" devices. For example, the devices for sinking current from the DIFF node are much smaller than the devices in amplifiers 1405 and 1506 for sourcing current into the DIFF node. During current control mode, if the battery voltage is below the control voltage value at node 1402 (e.g., the programmed current control to voltage control threshold), then positive input to amplifier 1405 (BSENSE) is below the negative input, and the output of amplifier 1405 will attempt to sink current from DIFF. However, the output of current controller amplifier 1506 will be driving the DIFF node in the positive direction. Thus, because the pull-down output of amplifier 1405 is weaker than the pull-up output of amplifier 1506, the system will be dominated by constant current controller 1500. Similarly, when the voltage on the battery (BSENSE) increases to the point where the positive and negative inputs of amplifier 1405 are equal, the voltage controller will dominate. At this point, the current through the sense resistor will begin to decrease, and the output of amplifier 1506 will start to pull down. However, because the pull-down output of amplifier 1506 is weaker than the pull-up output of amplifier 1405, the system will be dominated by constant voltage controller 1400.

Figure 16:
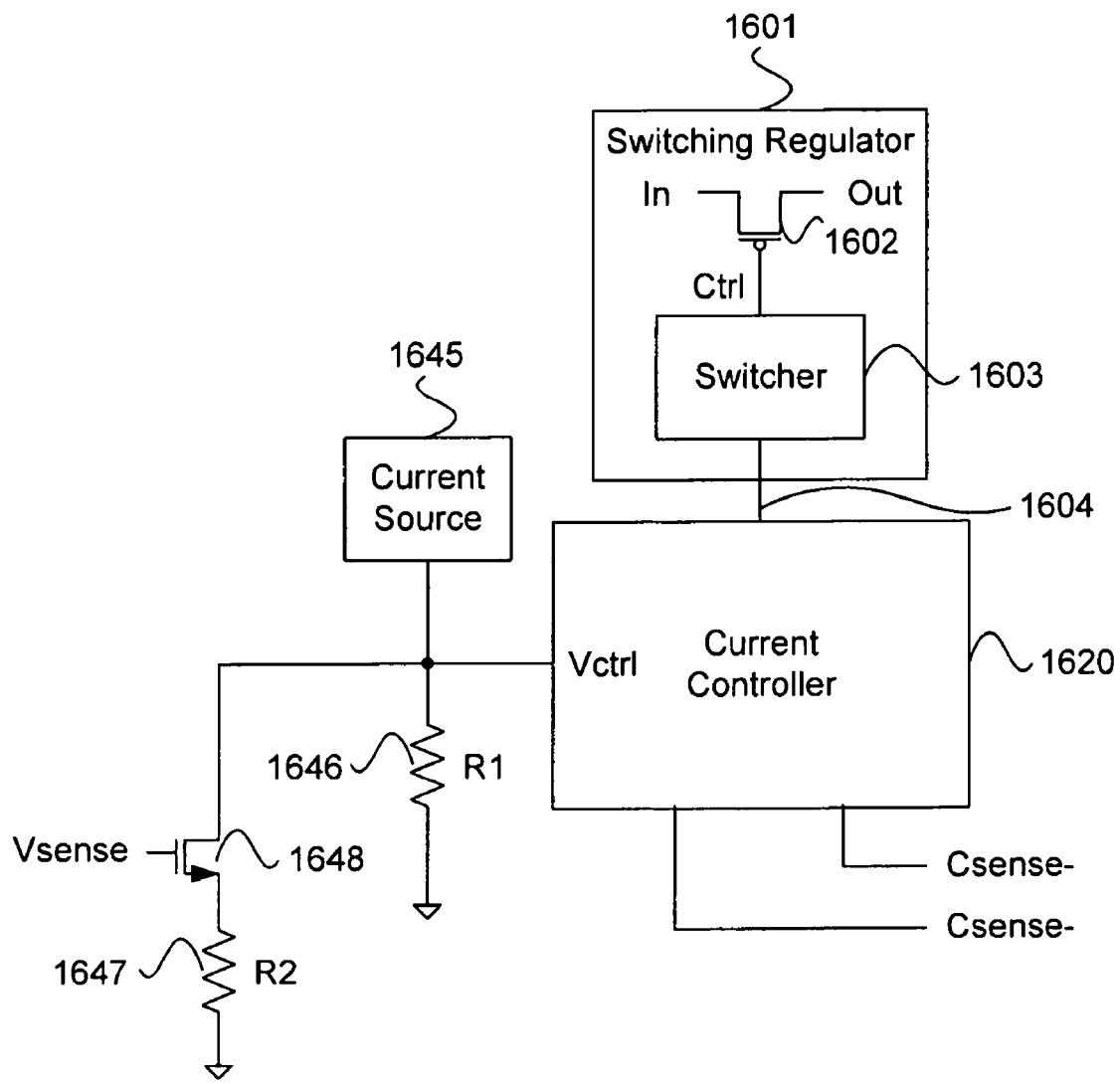
FIG. 16 is an example of an analog controller according to one embodiment of the present invention.

FIG. 16 illustrates an example analog controller according to one embodiment of the present invention. A current controller 1620 includes a first input coupled to "Csense+" and a second input coupled to "Csense−." Here, Csense+ is coupled to the positive terminal of an output current sense resistor, and Csense− is coupled to the negative terminal of the output current sense resistor. Current controller 1620 will generate a control signal to the control input 1604 of switching regulator 1601. Switching regulator 1601 includes a switching circuit 1603, which will, in turn, generate a switching signal (e.g., a pulse width modulated signal) to the gate of switching transistor 1602 (switching regulator 1601 may also include an error amplifier which has been omitted for illustrative purposes). Current controller 1620 further includes a control input, Vctrl. The voltage at Vctrl may be used to control the battery current. In this example, the voltage at the control input to current controller 1620 is set by a current source 1645 into a resistor 1646 ("R1"). When the system is in precharge mode, the current provided by current source 1645 may be less than the current provided when the system is in fast charge mode. When the system initially enters fast charge mode, the current into resistor 1646 may set a maximum voltage at Vctrl corresponding to the maximum desired output current. Maximum output current at the beginning of the fast charge cycle may be set by design choice in a variety of ways, including by selection of resistor 1646. The voltage Vsense is derived from either the switching regulator input current or battery voltage. Initially, when fast charge mode begins, the voltage Vsense biases transistor 1648 on the edge of conduction. As the voltage on the battery increases, or as the input current to the switching regulator increases, Vsense will increase. As Vsense increases, transistor 1648 will turn on and conduct a current (i.e., Vsense/R2), which will steal current away from resistor 1646, thereby causing the voltage at the control input of current controller 1620 to decrease. Accordingly, as Vctrl decreases, current controller 1620 reduces the output current generated by switching regulator 1601. Therefore, as the battery voltage increases, or as the input current increases, Vsense will cause the current controller 1620 to reduce the output battery current.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A Universal Serial Bus (USB) battery charger comprising:
    a switching regulator having at least one switching transistor, the switching transistor having a first input and a first output, wherein the first input of the switching transistor is coupled to a USB power source; and
    a filter having a first input and a first output, wherein the first input of the filter is coupled to the first output of the switching transistor;
    wherein the switching regulator is configured to receive a USB voltage, and generate a switching signal to a control terminal of the switching transistor, and wherein a switching current and a switching voltage at the output of the switching transistor are coupled through the filter to a battery to generate a filtered current and a filtered voltage to charge the battery, wherein the battery is coupled to the first output of the filter,
    wherein the filtered current is greater than a first input current into the first input of the switching transistor, and the filtered current is reduced, in a current control mode, as a voltage on the battery increases.

2. The battery charger of claim 1 wherein the filtered voltage is sensed by a voltage controller to control the switching signal at the control terminal of the switching transistor.

3. The battery charger of claim 2 wherein the voltage controller includes a first input coupled to a programmable data storage element, a second input coupled to sense voltage, and an output coupled to the control input of the switching transistor, wherein the programmable data storage element configures the voltage controller to generate a programmed voltage to said battery if the voltage on said battery is above the first threshold.

4. The battery charger of claim 1 wherein the filtered current is sensed by a current controller to control the switching signal at the control terminal of the switching transistor.

5. The battery charger of claim 4 wherein the current controller includes a first input coupled to a programmable data storage element, a second input coupled to sense current, and an output coupled to the control input of the switching transistor, and wherein the programmable data storage element configures the current controller to supply a first programmed current to said battery if the voltage on said battery is below a first threshold.

6. The battery charger of claim 4 wherein the current controller receives an input signal indicating a maximum input current, the input signal programming the current controller to set a maximum battery current based on the maximum input current.

7. The battery charger of claim 1 wherein the USB voltage is in a range of at least 4.1 volts to 5.25 volts.

8. A method of charging a battery from a Universal Serial Bus (USB) port comprising:
    receiving a first input voltage and a first input current at an input of a switching regulator from a USB power source;
    coupling a switching output voltage and current from the switching regulator through a filter to a terminal of a battery; and
    generating a first output voltage and a first output current at the terminal of the battery;
    wherein the first input voltage is greater than the first output voltage on the battery, the first output current to the battery is greater than the first input current, and wherein the first output current is reduced, in a current control mode, as the first output voltage on the battery increases.

9. The method of claim 8 further comprising receiving a logic signal corresponding to a USB port type, wherein the first output current is greater than 100 mA and the first input current is below 100 mA when the logic signal is in a first state, and the first output current is greater than 500 mA and the first input current is below 500 mA when the logic signal is in a second state.

10. The method of claim 8 further comprising storing a charging parameter in a programmable data storage element, wherein the first output current is set by said charging parameter.

11. The method of claim 8 wherein the switching regulator senses the first output voltage and generates a switching signal to control the first output voltage.

12. The method of claim 11 further comprising storing a charging parameter in a programmable data storage element, wherein the first output voltage is set by said charging parameter.

13. The battery charger of claim 1 wherein the switching regulator includes a control input, and wherein the first output of the filter is coupled to the battery through a first resistor, the battery charger further comprising:
    a current controller having first and second current sense inputs coupled to first and second terminals of the first resistor for sensing the filtered current, and a control output coupled to the control input of the switching regulator; and a voltage controller having a first voltage sense input coupled to the battery for sensing the voltage on the battery, and a control output coupled to the control input of the switching regulator.

14. The battery charger of claim 13 wherein the current controller includes a control input for setting the filtered current, and wherein a first logic signal corresponding to a maximum USB current is coupled to the control input of the current controller to set the filtered current.

15. The battery charger of claim 1 further comprising a current controller to set the filtered current to be greater than the first input current received at the first input of the switching transistor.

16. The battery charger of claim 1 further comprising a current controller, wherein a control input of the current controller is coupled to the first input of the switching transistor, and the current controller reduces the filtered current in response to a control signal received at the control input as the voltage on the battery increases.

17. The battery charger of claim 13 further comprising:
a first programmable data storage element coupled to a control input of the current controller for setting the filtered current, wherein the first programmable data storage element configures the current controller to supply a first programmed current to said battery if the voltage on said battery is below a first threshold; and
a second programmable data storage element coupled to a control input of the voltage controller for setting the first output voltage, wherein the second programmable data storage element configures the voltage controller to generate a programmed constant voltage to said battery if the voltage on said battery is above the first threshold.

18. The battery charger of claim 1 further comprising a current controller, wherein a control input of the current controller is coupled to the battery, and the current controller reduces the filtered current in response to a control signal received at the control input as the voltage on the battery increases.

19. The battery charger of claim 1 wherein the first input current is maintained approximately constant as the filtered current is reduced.

20. The battery charger of claim 19 wherein the first input current is below a threshold.

21. The battery charger of claim 1 wherein the filtered current is reduced before a transition from said current control mode to a voltage control mode.

22. The battery charger of claim 21 wherein the filtered current is reduced after a precharge period.

23. The battery charger of claim 1 wherein the filtered current is set at a value above a maximum current capability of the USB power source and reduced under control of a current controller circuit.

24. The battery charger of claim 1 wherein the filtered current is greater than a maximum current capability of the USB power source.

25. The method of claim 8 wherein the first input current is maintained approximately constant as the first output current is reduced.

26. The method of claim 25 wherein the first input current is below a threshold.

27. The method of claim 25 further comprising sensing the first input current and controlling the first output current to reduce based on the first input current.

28. The method of claim 8 wherein the first output current is reduced before a transition from said current control mode to a voltage control mode.

29. The method of claim 28 wherein the first output current is reduced after a precharge period.

30. The method of claim 8 wherein the first output current is set at a value above a maximum current capability of the USB power source and reduced under control of a current controller circuit.

31. The method of claim 8 wherein the first output current is greater than a maximum current capability of the USB power source.

32. A circuit comprising:
a switching regulator having a first input to receive an input voltage and an input current from a USB power source and a first output coupled to a battery;
a current controller coupled to the switching regulator; and
a voltage controller coupled to the switching regulator,
wherein the current controller and switching regulator operate in a current control mode to generate an output current to the battery, and wherein the voltage controller and switching regulator operate in a voltage control mode to generate an output voltage to the battery, and
wherein, during at least a of portion of the current control mode, the input voltage is greater than the output voltage on the battery, the output current to the battery is greater than the input current to the switching regulator, and the current controller reduces the output current to the battery as the voltage on the battery increases.

33. The circuit of claim 32 further comprising an input sense circuit to sense the input current from the USB power source, wherein an input of the current controller is coupled to the input sense circuit to reduce the output current to the battery as the voltage on the battery increases.

34. The circuit of claim 33 wherein the input sense circuit comprises a resistor between the first input of the switching regulator and an output of the USB power source.

35. The circuit of claim 32 further comprising means for sensing the input current from the USB power source, wherein an input of the current controller is coupled to said means for sensing the input current to reduce the output current to the battery as the voltage on the battery increases.

36. The circuit of claim 32 wherein the input current is maintained approximately constant as the output current is reduced.

37. The circuit of claim 32 wherein the output current is reduced before a transition from the current control mode to the voltage control mode.

38. The circuit of claim 37 wherein the output current is reduced after a precharge period.

39. The circuit of claim 32 wherein, during the current control mode, the output current is greater than a maximum current capability of the USB power source.

40. The circuit of claim 32 further comprising an analog-to-digital converter coupled to the first input of the switching regulator and a digital-to-analog converter coupled to an input of the current controller, wherein the output current is reduced incrementally.

41. The circuit of claim 32 further comprising an analog-to-digital converter coupled to the battery and a digital-to-analog converter coupled to an input of the current controller, wherein the output current is reduced incrementally.

42. The circuit of claim 32 further comprising a current sense circuit coupled to an input of the current controller, wherein the output current is reduced continuously.

43. The circuit of claim 32 further comprising an input current sense circuit and an output current sense circuit, wherein during a first time period of the current control mode, the output current sense circuit controls the output current to the battery to be constant, and wherein during a second time period of the current control mode after the first time period, the input sense circuit controls the output current to the battery to reduce as the voltage on the battery increases.

44. The circuit of claim 32 further comprising means for sensing the output voltage on the battery, wherein an input of the current controller is coupled to said means for sensing the output voltage to control the output current to the battery to reduce as the voltage on the battery increases.

45. The circuit of claim 32 wherein said circuit is an integrated circuit.

* * * * *